(12) United States Patent
Oya et al.

(10) Patent No.: US 7,061,449 B2
(45) Date of Patent: Jun. 13, 2006

(54) PORTABLE INFORMATION TERMINAL, INFORMATION VIEWING METHOD, AND PROGRAM

(75) Inventors: Takashi Oya, Kanagawa (JP); Yuichi Bannai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 464 days.

(21) Appl. No.: 10/153,605

(22) Filed: May 24, 2002

(65) Prior Publication Data

US 2003/0001823 A1 Jan. 2, 2003

(30) Foreign Application Priority Data

Jun. 27, 2001 (JP) ............................. 2001-195187
Mar. 7, 2002 (JP) ............................. 2002-061706

(51) Int. Cl.
*G09G 5/00* (2006.01)
*H04M 1/00* (2006.01)

(52) U.S. Cl. ........................................ 345/2.3; 455/566
(58) Field of Classification Search ................. 345/2.1, 345/2.3, 6–9, 1.1, 2.2; 359/630; 455/556.1, 455/422.1–566
See application file for complete search history.

(56) References Cited

U.S. PATENT DOCUMENTS

| | | | |
|---|---|---|---|
| 5,491,491 A * | 2/1996 | Lebby et al. ................... 345/7 |
| 5,838,300 A | 11/1998 | Takagi et al. ............... 345/145 |
| 5,969,698 A * | 10/1999 | Richard et al. ................. 345/7 |
| 6,046,712 A * | 4/2000 | Beller et al. .................... 345/8 |
| 6,057,835 A | 5/2000 | Sato et al. ................... 345/332 |
| 6,191,892 B1 | 2/2001 | Isaka et al. ................. 359/630 |
| 6,489,934 B1 * | 12/2002 | Klausner ..................... 345/1.1 |
| 2001/0054988 A1 * | 12/2001 | Cone et al. ..................... 345/7 |
| 2002/0036597 A1 | 3/2002 | Chigira et al. ................. 345/8 |
| 2002/0094845 A1 * | 7/2002 | Inasaka ....................... 455/566 |
| 2002/0111171 A1 * | 8/2002 | Boesch et al. .............. 455/456 |
| 2002/0151283 A1 * | 10/2002 | Pallakoff ..................... 455/90 |

FOREIGN PATENT DOCUMENTS

| CA | 2 335 996 A1 * | 12/1999 |
|---|---|---|
| JP | 9-274144 | 10/1997 |
| JP | 2000-10502 | 1/2000 |

* cited by examiner

*Primary Examiner*—Alexander Eisen
(74) *Attorney, Agent, or Firm*—Fitzpatrick, Cella, Harper & Scinto

(57) ABSTRACT

An information terminal comprises display means for performing a large-screen display via a sculptured surface prism. The information terminal connects to a cellular telephone using Bluetooth technology, obtains information held by a WWW server on the Internet through cooperation with the cellular telephone, and displays a screen for viewing the obtained information on the display means. Also, button operations made at the cellular telephone can be taken as input of the information terminal for performing operations on the screen of the display means. Thus, a portable information terminal which enables viewing of information on a network with a large screen can be provided, without compromising portability or operability.

18 Claims, 18 Drawing Sheets

PORTABLE INFORMATION TERMINAL, INFORMATION VIEWING METHOD, AND PROGRAM

BACKGROUND OF THE INVENTION

1. Field of the Invention

The present invention relates to a portable information terminal, information viewing method, and program, capable of cooperating with a cellular telephone to view information on a large screen.

2. Description of the Related Art

In recent years, ocular type display devices using enlarging optical system such as small liquid crystal displays and prisms or the like have come into use, of which the HMD (Head Mounted Display) is representative. The HMD is advantageous in that a large-screen display can be realized with a relatively small device, and development for further miniaturization is being pursued.

Also, with regard to portable information terminals such as cellular telephones and PDAs (Personal Digital Assistants), functions are being improved while communication infrastructures and contents are becoming more satisfactory, so an environment wherein such terminals can be used to easily view contents on a network such as the Internet is coming into place.

However, operating information devices while wearing an HMD has been difficult since there are restrictions on the field of view and so forth, and there has been a problem in that operations are limited in interactions in outdoor situations, in particular.

Also, information terminals such as cellular telephones and PDAs and the like have excellent usability with regard to ease of carrying and operability, and are suitable for use in outdoor situations, but the size of the terminal itself is restricted, so the display device cannot be made larger. Accordingly, a screen such as might be displayed on a desktop personal computer (PC) cannot be easily displayed thereon, and further, operations of the terminal for inputting text and the like is also restricted.

SUMMARY OF THE INVENTION

Accordingly, it is a first object of the present invention to provide a portable information terminal, information viewing method, and program, wherein neither portability nor operability are compromised, while enabling information on a network to be viewed with a large screen.

Also, it is a second object of the present invention to provide a portable information terminal, information viewing method, and program, wherein neither portability nor operability are compromised, while enabling information to be viewed with a large screen.

The present invention is a portable information terminal, comprising: display means for performing large-screen display via an ocular-type enlarging optical system; connecting means for communicably connecting with a cellular telephone which has a browser for viewing information on a network, and operating buttons; information viewing means for obtaining information on the network cooperatively with the cellular telephone connected via the connecting means, and displaying a screen for viewing the obtained information on the display means; operation input means for inputting operations of the operating buttons of the cellular telephone connected via the connecting means, as operations relating to viewing of information by the information viewing means.

Also, the present invention comprises: display means for performing large-screen display; connecting means for connecting with a cellular telephone which has operating buttons; and operating means for inputting operations of the operating buttons of the cellular telephone connected via the connecting means, as operations relating to the screen displayed by the display means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

First Embodiment

Figure 1:
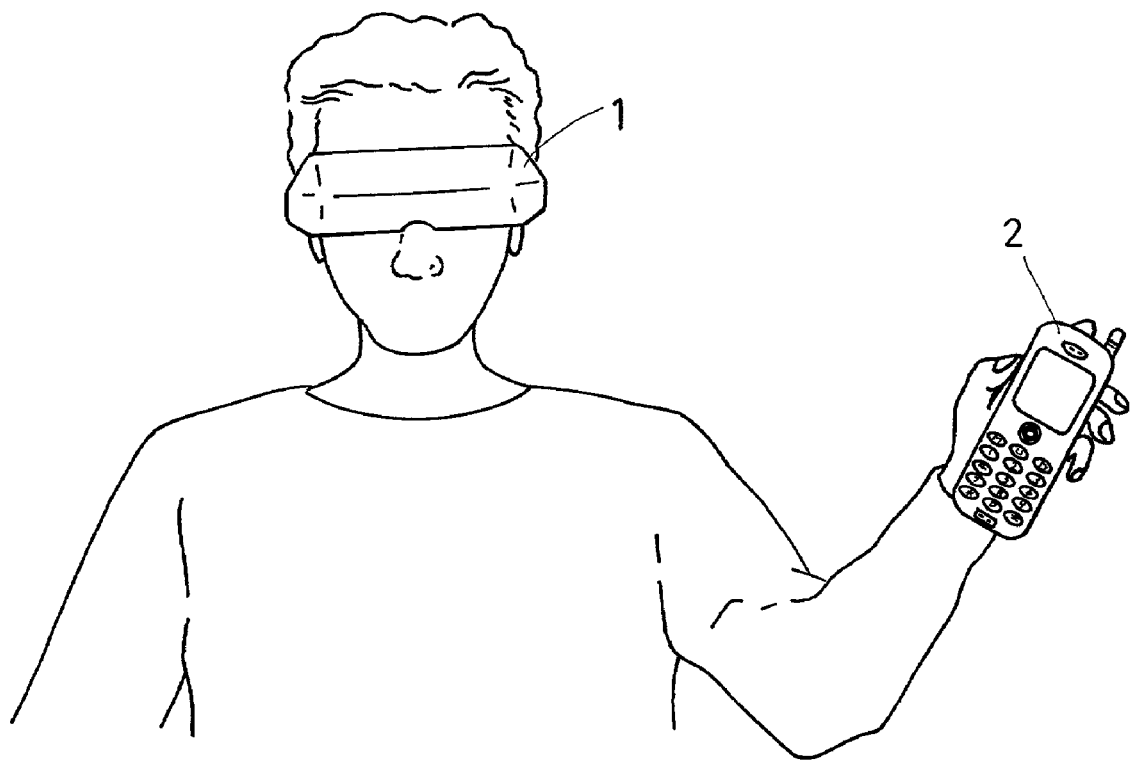
FIG. 1 is a diagram illustrating a state wherein a portable information terminal relating to a first embodiment of the present invention is being worn by a user.

FIG. 1 is a diagram illustrating the state of a user wearing the portable information terminal according to a first embodiment of the present invention. With the present embodiment, an example of an HMD which is worn on the head of the user will be described as the portable information terminal.

The portable information terminal (hereafter referred to as "information terminal") 1 is configured as an HMD which is worn on the user's face in the same manner as with eyeglasses, as shown in FIG. 1. The user accesses a network from the information terminal 1 via a cellular telephone 2, and can view contents on the network, on the display means of information terminal 1. The information terminal 1 and the cellular telephone 2 are capable of interactive data communication by close-distance wireless communication. The user performs operations necessary for viewing with the buttons of the cellular telephone 2, and operation information of the buttons of the cellular telephone 2 are input to the information terminal 1, thereby activating various actions.

Figure 2:
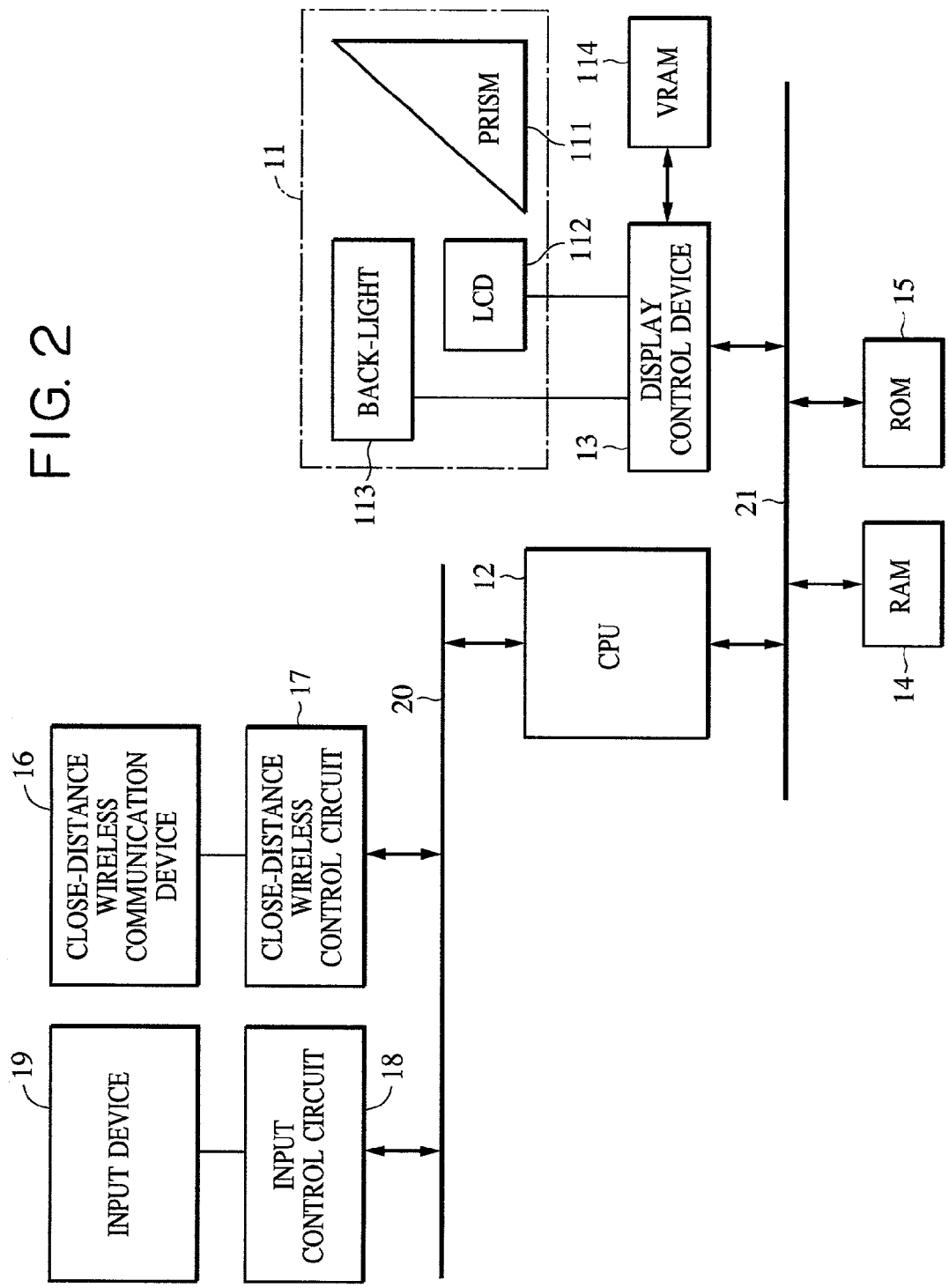
FIG. 2 is a block diagram illustrating the configuration of the information terminal 1 shown in FIG. 1.
Figure 3:
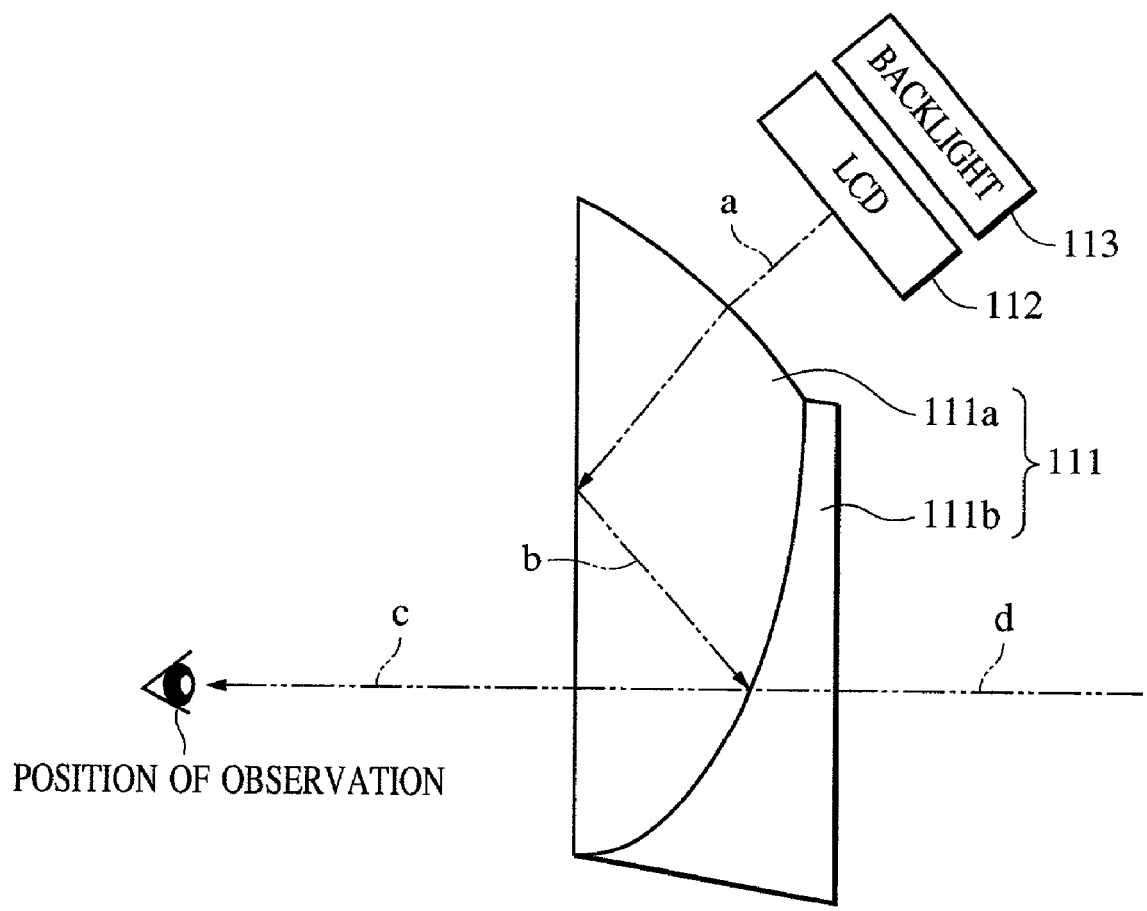
FIG. 3 is a diagram schematically illustrating the distribution of a back-light 113, LCD 112, and sculptured surface prism 111 in display means 11 shown in FIG. 2.

Next, the configuration of the information terminal 1 will be described with reference to FIGS. 2 and 3. FIG. 2 is a block diagram illustrating a configuration of the information terminal 1 shown in FIG. 1, and FIG. 3 is a diagram schematically illustrating the distribution of the back-light 113, LCD 112, and sculptured surface prism 111 in the display means 11 shown in FIG. 2. Except as otherwise disclosed herein, the various components shown in outline or block form in the figures are individually well-known and there internal construction and operation is not critical to the making or using of this invention or to a description of the best mode of the invention.

As shown in FIG. 2, information terminal 1 comprises a CPU 12 for controlling the entire device by following programs stored in ROM (Read-Only Memory) 15, RAM (Random Access Memory) 14 for providing a work area for the CPU 12, the display control circuit 13 for controlling display of the display means 11, and VRAM (Video RAM) 114 storing image data to be displayed on the display means 11. The CPU 12, RAM 14, ROM 15, and display control circuit 13, are connected via a CPU bus 21.

The display means 11 comprise a pair of liquid crystal display devices (hereafter referred to as "LCD") 112 having a plurality of pixels for displaying information, a pair of back-lights 113 for illuminating the display screens of the LCDs 112, and a pair of sculptured surface prisms 111 for enlarging the display screens of the LCDs 112, wherein each of that LCDs 112, back lights 113, and sculptured surface prisms 111, are provided so as to correspond to the left and right eyes of the user. The LCDs 112 have, for example, the size of 1 inch or less, 24 bit, full-color, and have so-called SVGA resolution of 800×600 pixels. Such LCDs are generally called micro displays, and those produced by various manufacturers, such as Colorado Micro Display or Kopin Corporation, for example, can be used. As shown in FIG. 3, with the display means 11, a back-light 113 is disposed on the back side of the LCD 112 as viewed from the observation position of the user. Also, the sculptured surface prism 111 is formed by joining two optical members, a wedge-shaped prism 111a and a prism 111b. The joining face between optical members 111a and 111b is a semi-transmitting curve, whereby the optical members 111a and 111b guide the incident light from the LCDs 112 over an optical path indicated by the 2-dot broken line in the figure, indicated by symbols a, b, and c, to the observation position. Also, external light is guided to the observation position over the optical path indicated by the two-dot broken line indicated by d and c. Due to the sculptured surface prism 111, the user can superimpose and view the enlarged image of the LCDs 112 and external scenery (e.g., the buttons on the cellular telephone 2 in the hand of the user), at the above observation position. The technology for these optical systems is already disclosed in Japanese Patent Laid-Open No. 9-274144 and Japanese Patent Laid-Open No. 2000-10502 and so forth. Using these technologies allows the user to operate the buttons on the cellular telephone 2 and view the information on a large screen, in the state of wearing the information terminal 1.

Also, as shown in FIG. 2, a close-distance wireless communication control circuit 17 and input control circuit 18 are connected to the CPU 12 via an I/O bus 20. The close-distance wireless communication control circuit 17 follows commands from the CPU 12 to control close-distance wireless communication device 16 for performing transmission and reception of data between the information terminal 1 and external devices. The close-distance wireless communication device 16 performs wireless communication preferably but not limited to following a close-distance communication standard called Bluetooth which uses frequency hopping in spread spectrum communication. More specifically, Bluetooth technology enables data communication at a data transfer rate of around 1 Mbps with another device up to around 10 m away, using a 2.4 GHz band frequency. As another non-limiting alternative, instead of the Bluetooth wireless method, IEEE 802.11b, which is a wireless LAN method using the same 2.4 GHz band, may be used. The input control circuit 18 inputs input signals from an input device 19 to the CPU 12. In the present embodiment, the input device is an electric power switch (not shown).

Software in the information terminal 1 is stored in ROM 15, and the software stored in the ROM 15 includes operating systems for managing memory, input/output devices, and other hardware, software for performing data communication with other terminals by close-distance wireless communication, browser software for viewing home pages described using HTML (HyperText Markup Language), operating software for activating software or changing the settings thereof, and so forth.

Figure 4A:
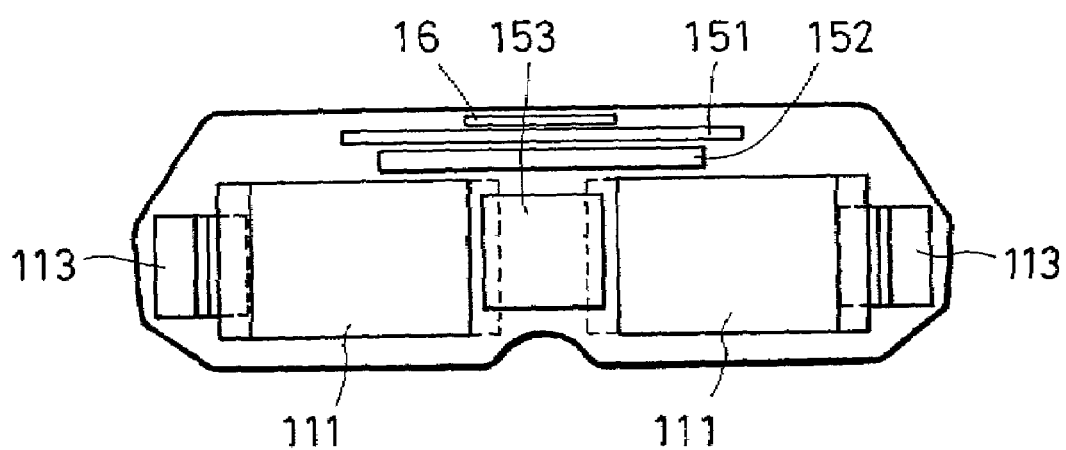
FIG. 4A is a perspective projection viewing the information terminal 1 shown in FIG. 1 from the front.

Next, the internal configuration of information terminal 1 will be described with reference to FIG. 4. FIG. 4A is a perspective projection viewing the information terminal 1 shown in FIG. 1 from the front, and FIG. 4B is a perspective projection viewing the information terminal 1 shown in FIG. 1 from the bottom.

Figure 4B:
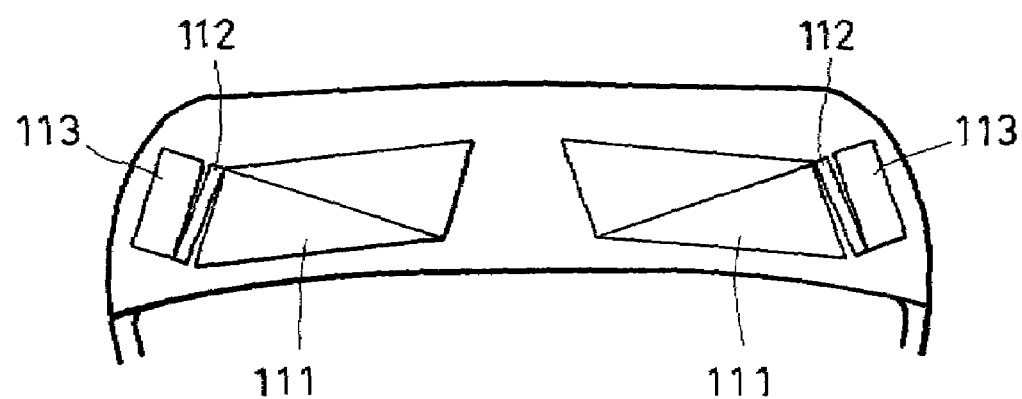
FIG. 4B is a perspective projection viewing the information terminal shown in FIG. 1 from the bottom.

As shown in FIGS. 4A and 4B, the sculptured surface prisms 111, LCDs 112, and back lights 113, making up the display means 11, are disposed horizontally, with LCDs 112 and back-lights 113 being situated closer to the ears than the sculptured surface prisms 111. That is, the thickness of the display means 11 in the vertical direction is reduced by turning the optical system shown in FIG. 3 sideways, and accordingly the electric circuit board (later-described main board 151 and display control board 152) can be mounted at the top of the display means 11. At the top of the information terminal 1 are the close-distance wireless communication device 16, the main board 151 for the CPU 12 and the like are mounted, and the display control board 152 where the display control circuit 13 and the like are mounted, and further, a battery 153 is disposed between the left and right sculptured surface prisms 111. Accordingly, an information terminal 1 of an overall size wearable on the head of the user, is realized.

Figure 5:
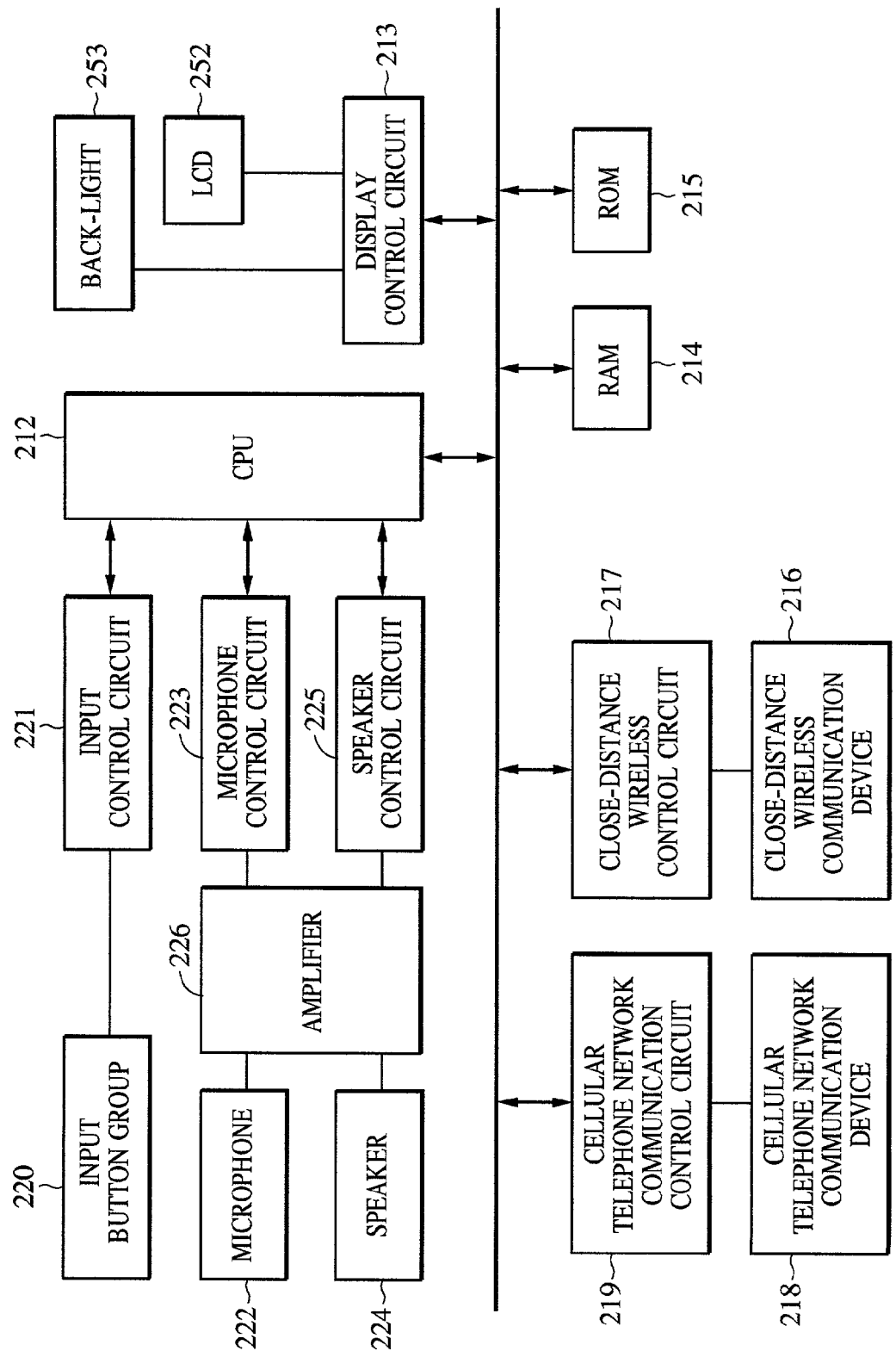
FIG. 5 is a block diagram illustrating the configuration of the cellular telephone 2 shown in FIG. 1.

Next, the configuration of a cellular telephone 2 which performs communication with the information terminal 1 via the close-distance wireless communication device 16 will be described with reference to FIG. 5. FIG. 5 is a block diagram illustrating the configuration of the cellular telephone 2 shown in FIG. 1.

As shown in FIG. 5, the cellular telephone 2 comprises a CPU 212 for controlling the entire device by following programs stored in a ROM 215, RAM 214 for providing work space for the CPU 212, the display control circuit 213 for controlling display of a liquid crystal panel (made up of an LCD 252 and the back-light 253) around 2.2 inches in size, communication means for connecting with a mobile communication network following PDC or IMT-2000 standards (configured of a cellular telephone network communication control circuit 219 and a cellular telephone network communication device 218), and close-distance wireless communication means for performing a wireless communications following close-distance communication standards such as Bluetooth, capable of communicating with the information terminal 1 (configured of a close-distance wireless communication control circuit 217 and close-distance wireless communication device 216).

At the cellular telephone 2, sound is input to a microphone 222 and converted into at analogue audio signals, with the audio signals being amplified by an amplifier 226 and then input to a microphone control circuit 223. The microphone control circuit 223 digitizes the input audio signals into audio data, and this audio data is input to the CPU 212. Also, at the time of audio output, audio data from the CPU 212 is converted into analog audio signals at a speaker control circuit 225, and the audio signals are amplified at an amplifier 226 and then output from a speaker 224. Also, the cellular telephone 2 has an input button group 220 including a plurality of operating buttons, and input from the input button group of 220 is input to the CPU 212 via the input control circuit 221.

The software stored in the ROM 215 of the cellular telephone 2 includes operating systems for managing hardware such as memory or input/output devices, communication software for connecting to the Internet via a cellular telephone network, software for data communication with the other terminals (e.g., the information terminal 1) via a close-distance wireless communication network, and so forth. Further included therein is software such as browser software for viewing home pages described using description languages for cellular telephones, such as c-HTML or XHTML-Basic, and operating software for activating the software and changing the settings thereof. The operating system of the cellular telephone 2 corresponds to multithreading or multiprocessing wherein multiple software modules are processed simultaneously, and accordingly, simultaneous connection with a mobile communication network and a close-distance wireless communication network, for example, can be made. Such software is normally recorded in the ROM 215 at the time of shipping, but the cellular telephone unit may be connected to a dedicated maintenance device via an external connection terminal, so as to update the contents of the software from the maintenance device. Also, updating by the user him/herself may be realized by providing a slot for a small-sized memory card such as an SD card or Memory Stick (a registered trademark) in the hardware. Also, cellular telephones with Java (a registered trademark) VM are already on the market, so Java (registered trademark) applets can be readily downloaded via network. Thus, software for controlling the cellular telephone can be updated using such means.

Figure 6:
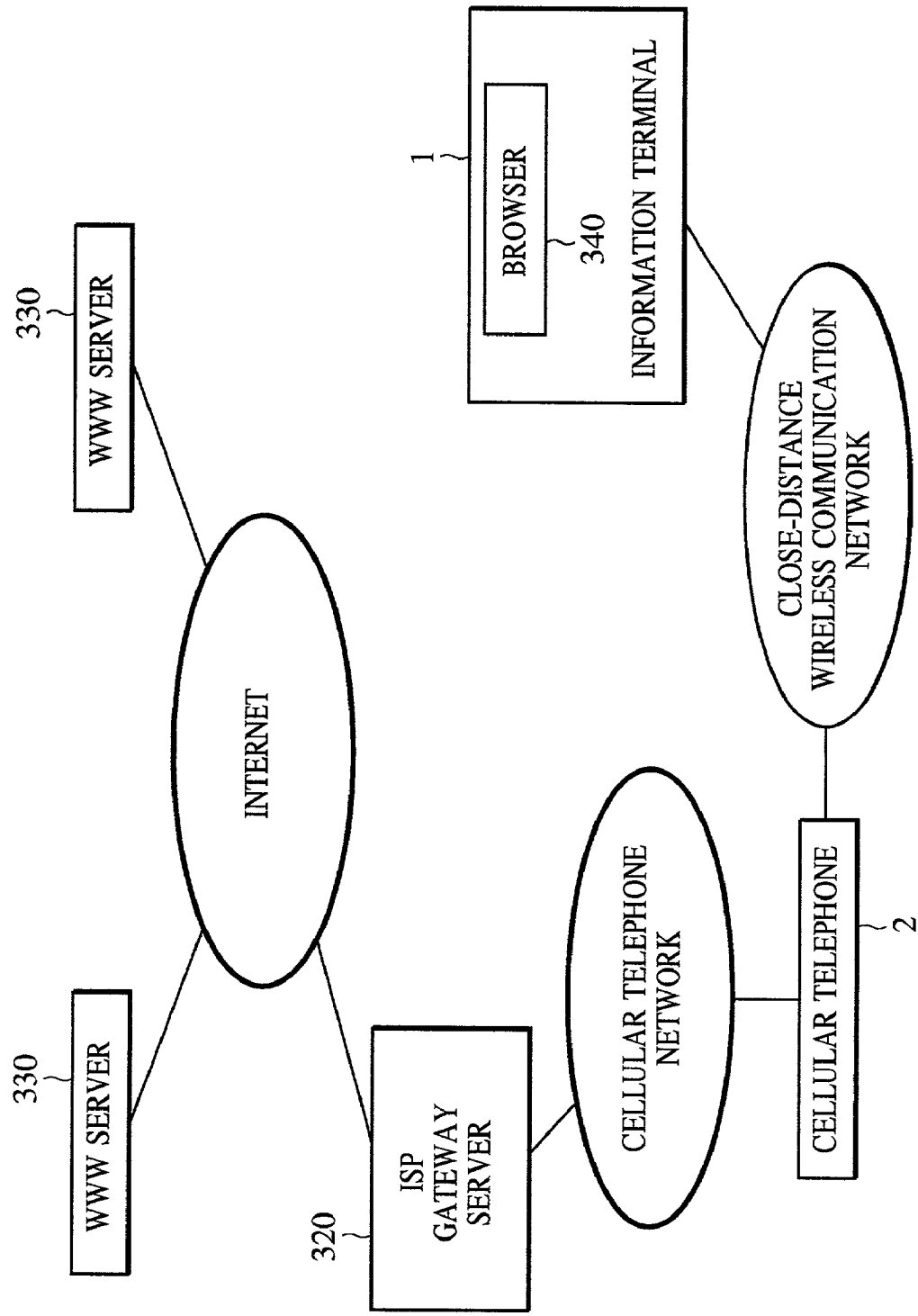
FIG. 6 is a configuration diagram of a communication network structured for viewing information on a network using the information terminal 1 and the cellular telephone 2 shown in FIG. 1.

Next, a communication network structured in the event of viewing information on a network using the information terminal 1 and cellular telephone 2 will be described with reference to FIG. 6. FIG. 6 is a configuration diagram of a communication network structured for viewing information on a network using the information terminal 1 and the cellular telephone 2 shown in FIG. 1.

As shown in FIG. 6, with the present embodiment the information terminal 1 is connected to the cellular telephone 2 by close-distance wireless communication, and the cellular telephone 2 is connected to the Internet via at a cellular telephone network and an ISP (Internet Service Provider) Gateway server 320. The information terminal 1 accesses a WWW server 330 on the Internet through the above-described path, obtains information which the WWW server 330 holds, and displays this on the display means 11 with the browser 340 of the information terminal 1. A separate connection is set with the close-distance wireless communication between the information terminal 1 and cellular telephone 2 in addition to the above-described connection for data communication with the Internet, for sending text information input at the cellular telephone 2 to the information terminal 1. In the case of using Bluetooth technology, the connection is performed through a serial port profile or a generic object exchange profile, or the like. Also, a connection is made with the Internet via the cellular telephone network (Mobile Communication Network) and ISP gateway server 320, by dial-up connection, using a dial-up networking profile.

Figure 7A:
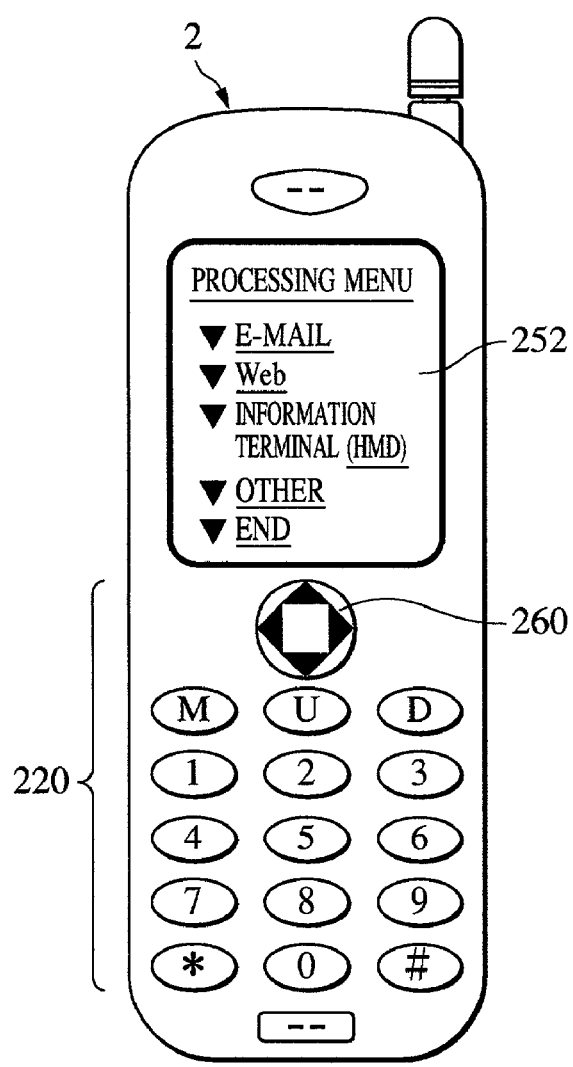
FIGS. 7A and 7B are diagrams illustrating screen examples displayed on the cellular telephone 2 shown in FIG. 1, and the key arrangement thereof.
Figure 7B:
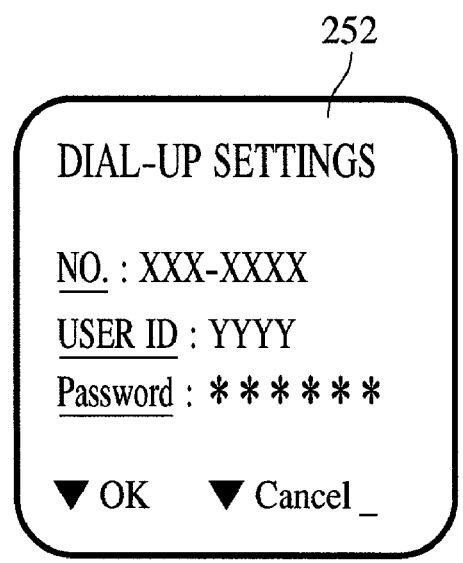

Next, the operations at the time of viewing information on a network will be described with reference to FIGS. 7A through 8. FIGS. 7A and 7B are diagrams illustrating screen examples displayed on the cellular telephone 2 shown in FIG. 1, and the key arrangement thereof, and FIG. 8 is a diagram illustrating an example of a WWW browser screen displayed on the information terminal 1 shown in FIG. 1.

In the event of viewing information on a network using the information terminal 1, the user first presses the input device 19 (electric power switch) of the information terminal 1 to turn the electric power on, and then wears the information terminal 1 on his/her head so that the screen of the display means 11 can be viewed. Next, from the input button group 220 illustrated in FIG. 7A, the user presses the menu button "M". Here, we assume that the electric power of the cellular telephone 2 is already turned on. Upon the menu button "M" being pressed, a processing menu screen such as shown in FIG. 7A is displayed on the LCD 252 of the cellular telephone 2. Various types of processing are activated by selecting the desired items using a cursor moving/selecting button 260 on this processing menu screen. Here, let us say that the item for the information terminal (HMD) has been selected which displays a screen such as shown in FIG. 7B on the LCD 252 of the cellular telephone 2. On this screen, the telephone number of the ISP for the dial-up connection, the user ID, and password are set, and the OK button is pressed, whereby communication between the information terminal 1 and a cellular telephone 2, and communication between the cellular telephone 2 and the ISP gateway server 320 is performed, thereby displaying a WWW browser screen such as shown in FIG. 8 on the display means 11 of the information terminal 1. At this point, the results of button input to the cellular telephone 2 become the input to the information terminal 1, and are reflected on the screen of the information terminal 1. The browser 340 of the information terminal 1 has approximately the same functions as those commonly used for personal computers.

Figure 8:
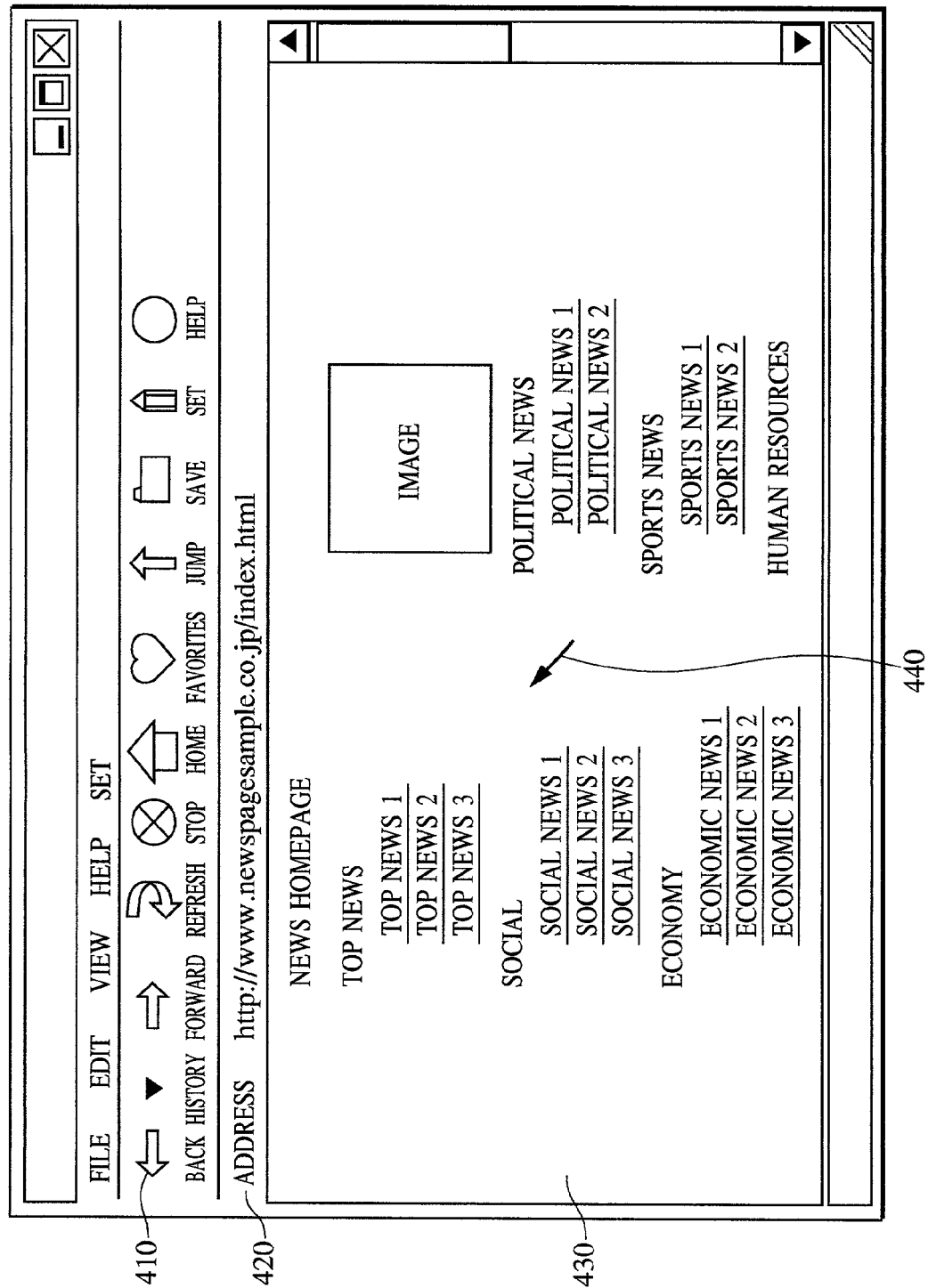
FIG. 8 is a diagram illustrating an example of a WWW browser screen displayed on the information terminal 1 shown in FIG. 1.

As shown in FIG. 8, this WWW browser screen includes an area 410 containing a menu area for performing browser operations and a button array area, and area 420 for displaying/inputting URLs (Uniform Resource Locators) indicating the location of files and file names, and an area 430 for displaying contents described in HTML. A cursor 440 for-indicating the operating position on the screen is displayed on the screen. This cursor 440 is operated by a cursor moving/selecting button 260 of the cellular telephone 2, and activation/selection of desired operations can be executed using this cursor moving/selecting button 260. This button 260 is configured of a 4-directional tact switch with a push button, or the like, and can be readily configured with one button by appropriating movement of the cursor in the four directions on the screen to the 4-directional switch and activation/selection to the push button, respectively. Accordingly, the cursor 440 is moved on the WWW browser screen by button operations by the user, with button icon or menu content selection operations being performed in the area 410 and URL input being performed in the area 420 from the input button group 220, and anchor tag selection operations and text data inputting and so forth is performed in the area 430. As shown in FIG. 7A, multiple numeral buttons are contained in the input button group 220, but text input methods wherein letters, symbols, Kana, and so forth are appropriated to these buttons for input, are well known.

As described above, the user can operate the browsers screen on the information terminal 1 using the input button group 220 (including the button 260) of the cellular telephone 2, to obtain desired information.

Upon the operations in the browsers screen being completed and the user pressing the menu button "M" in the input button group 220, all communication processing ends, and the electric power of the information terminal 1 is turned off. Also, the processing menu screen shown in FIG. 7A comes up on the LCD 252 of the cellular telephone 2. The pressing operations of the input button group 220 of the cellular telephone are reflected at the cellular telephone 2 at this time, so other processing in the processing menu may be selected, or the menu may be quit to return to normal call waiting state, by pressing operations of the input button group 220.

Figure 9:
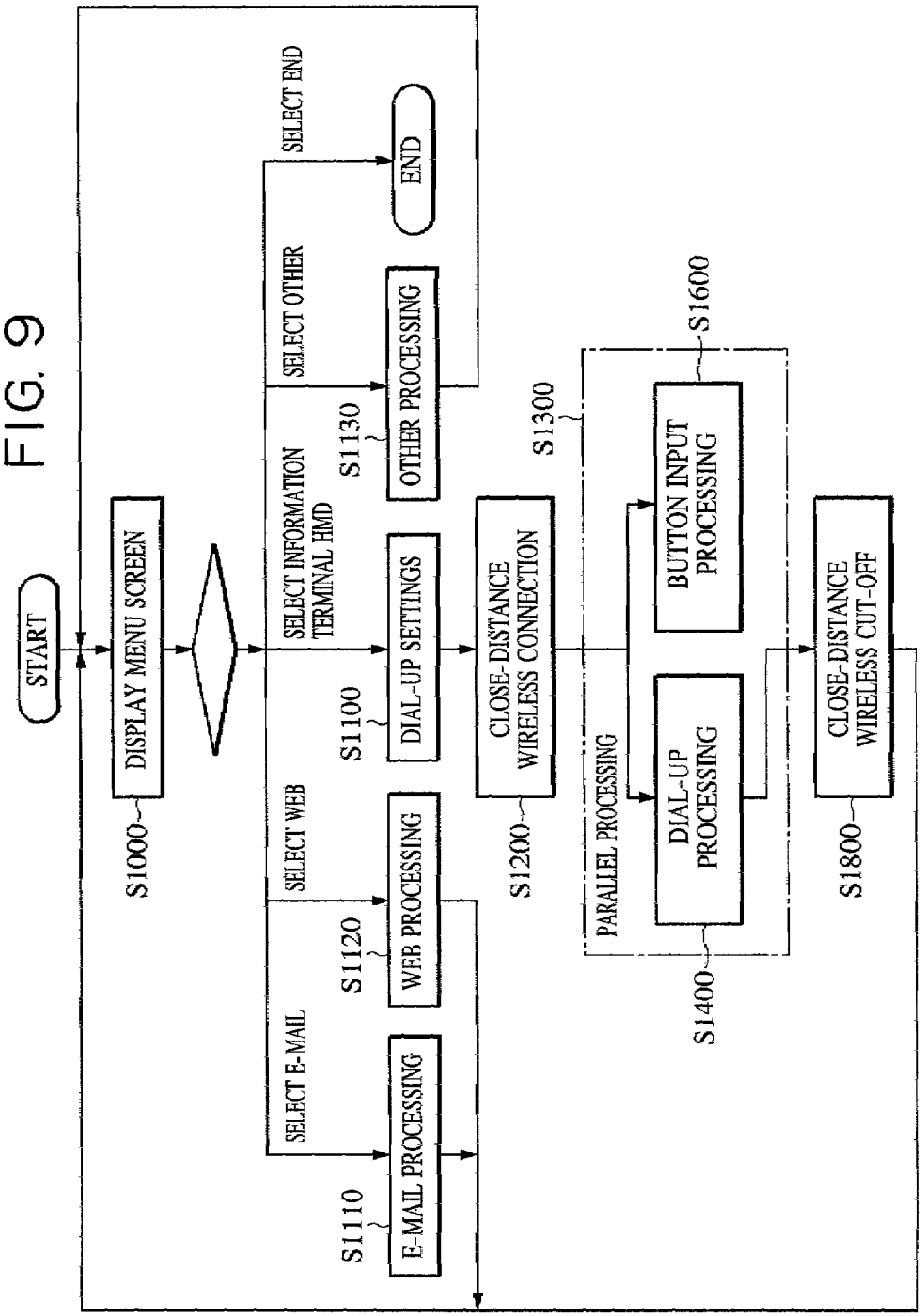
FIG. 9 is a flowchart illustrating the processing procedures at the cellular telephone 2 shown in FIG. 1.
Figure 11:
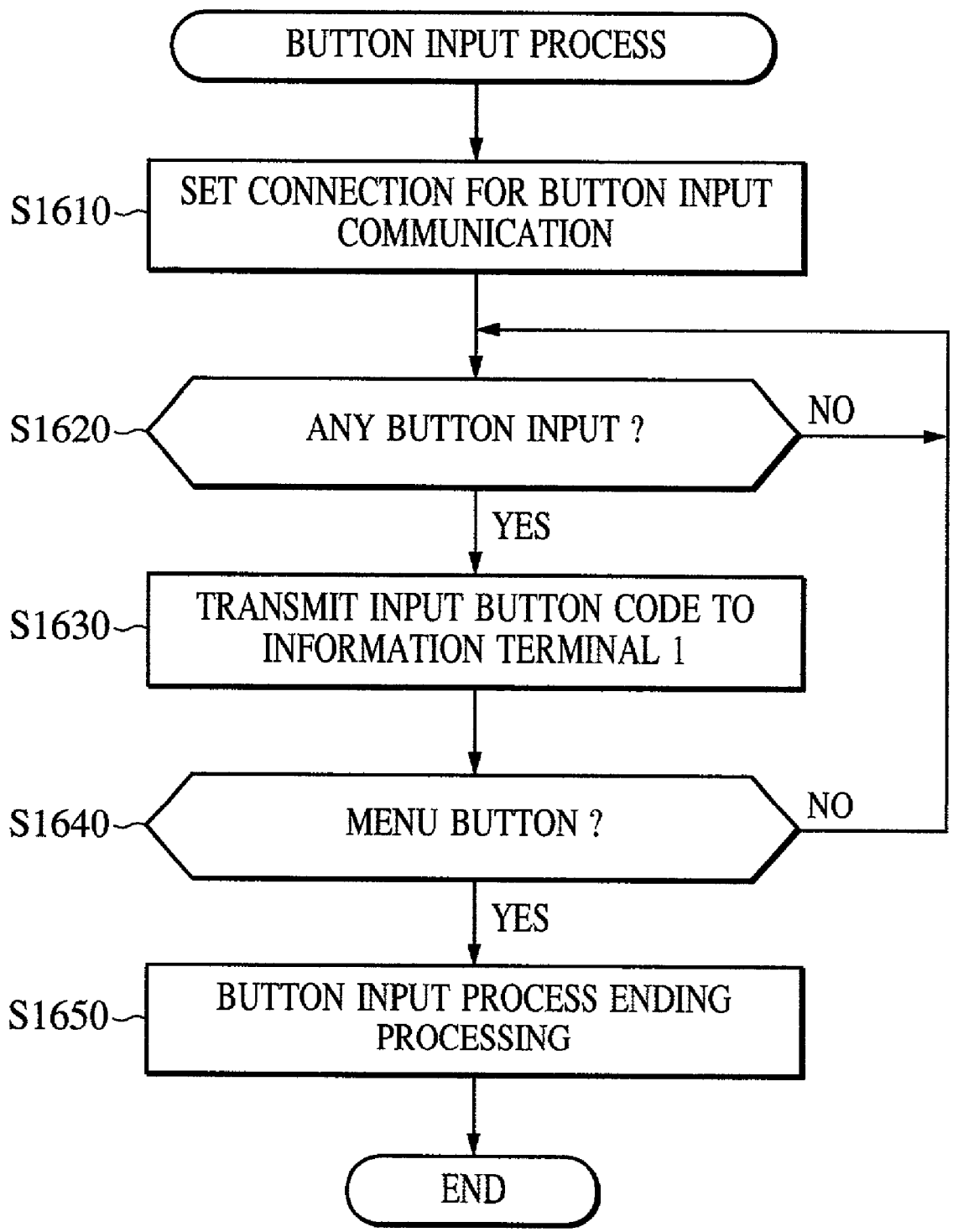
FIG. 11 is a flowchart illustrating the detailed procedures of the button input process (step S1600) shown in FIG. 9.
Figure 12:
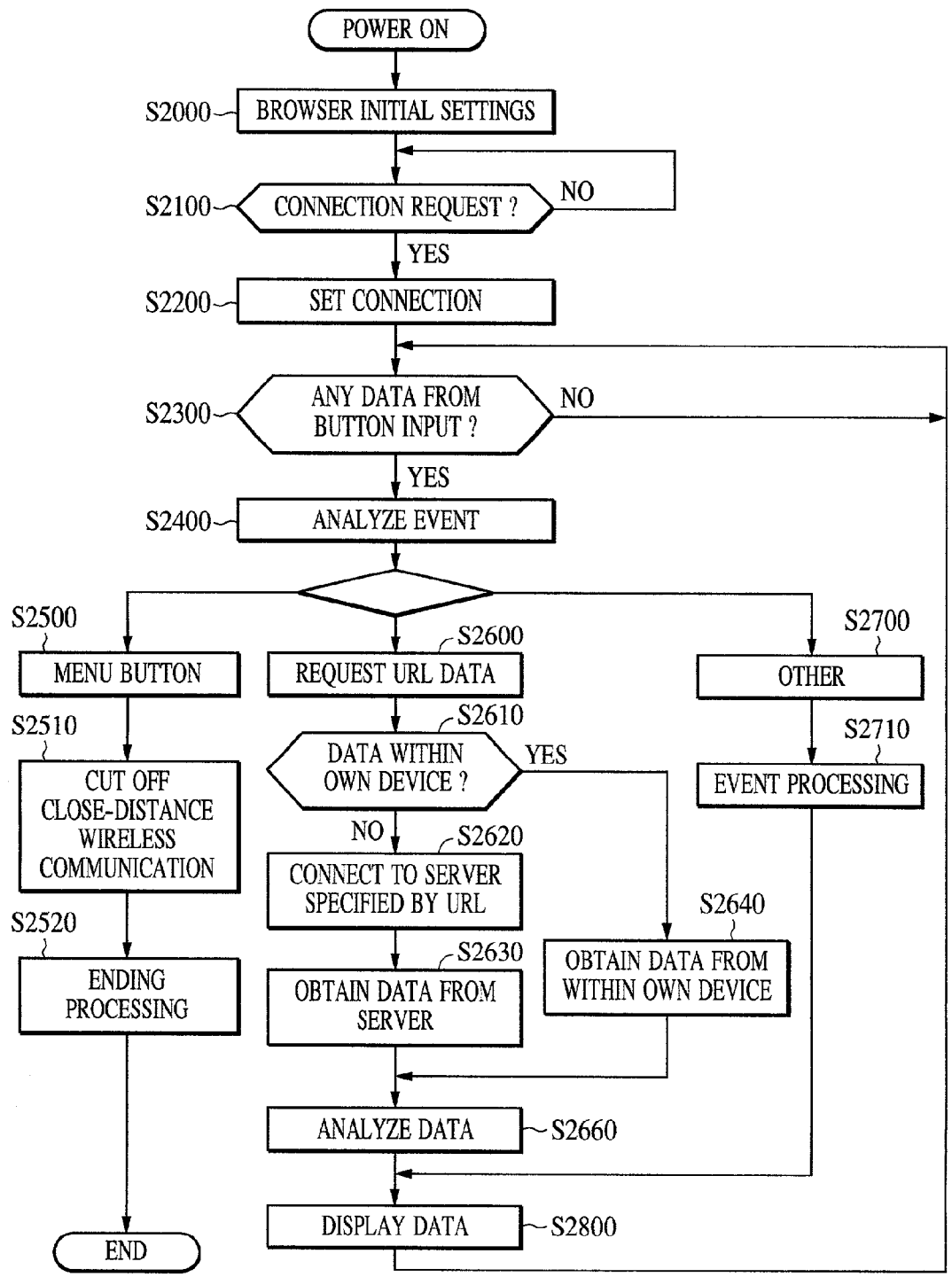
FIG. 12 is a flowchart illustrating the processing procedures of the information terminal 1 shown in FIG. 1.
Figure 13:
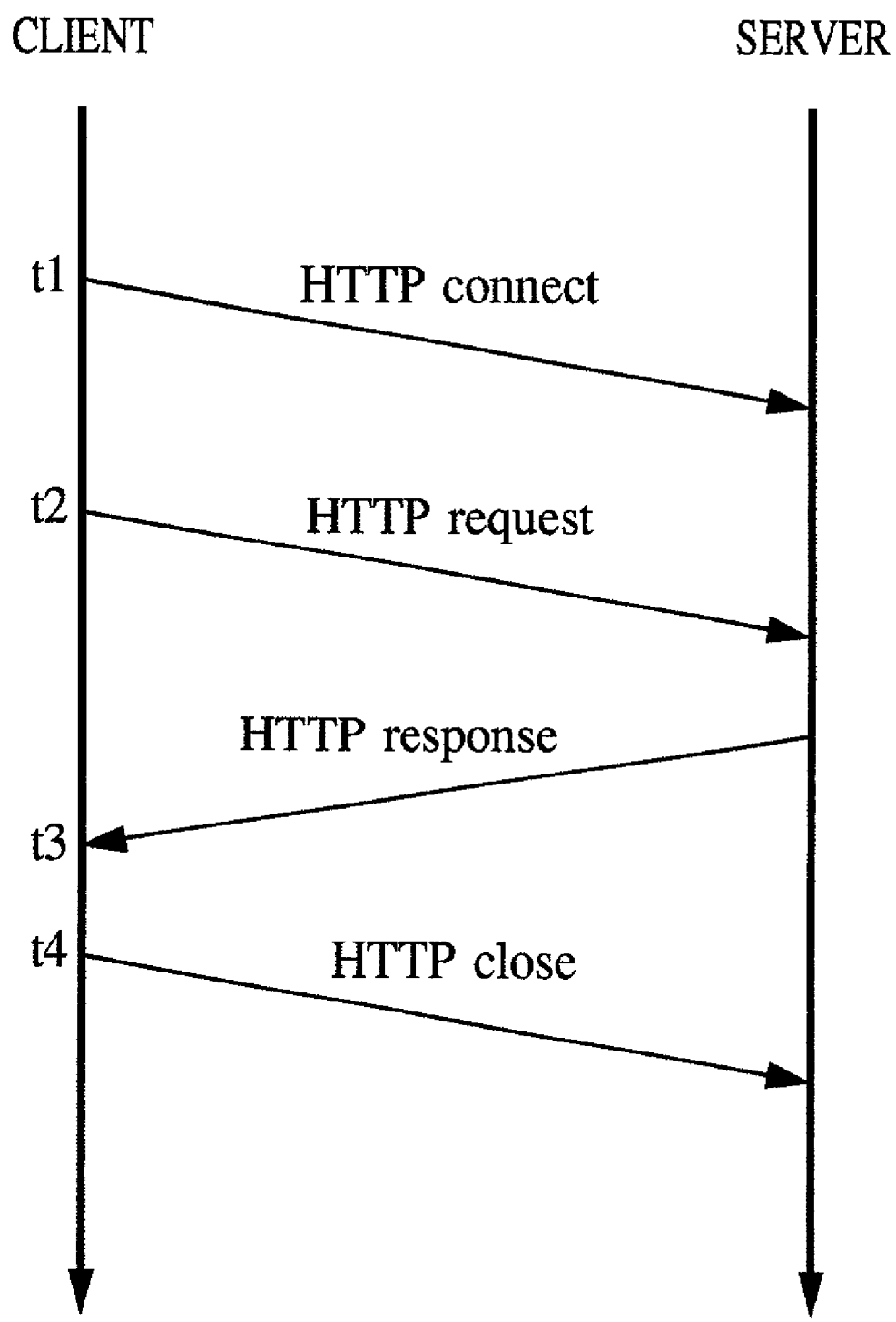
FIG. 13 is a diagram illustrating a transfer sequence between the cellular telephone 2 and a WWW server 330.

The above-described operations will be described in detail with reference to FIGS. 9 through 13. FIG. 9 is a flowchart illustrating the processing procedures at the cellular telephone 2 shown in FIG. 1, FIG. 10 is a flowchart illustrating the detailed procedures of the dial-up process (step S1400) shown in FIG. 9, FIG. 11 is a flowchart illustrating the detailed procedures of the button input process (step S1600) shown in FIG. 9, FIG. 12 is a flowchart illustrating the processing procedures of the information terminal 1 shown in FIG. 1, and FIG. 13 is a diagram illustrating a transfer sequence by HTTP between the cellular telephone 2 and a WWW server 330.

With the cellular telephone 2, upon the user pressing the menu button "M", the processing menu screen shown in FIG. 7A is displayed on the LCD 252 first in step S1000, as shown in FIG. 9. Here, in the event that a desired item is selected by the user on the processing menu screen, processing corresponding to the selected item is activated. For example, in the event that the item "mail" is selected, mail processing is executed in step S1110, and the flow returns to step S1000. In the event that the item "Web" is selected, Web processing with the cellular telephone 2 is executed In step S1120, and the flow returns to step S1000. In the event that the item "other" is selected, other processing is executed in step S1130, and the flow returns to step S1000. In the event that the "quit" item is selected, the processing quits, and the state returns to a normal call waiting state.

In the event that "information terminal (HMD)" is selected as the item above, in step 1100, dial-up setting is performed. Here, the screen shown in FIG. 7B is displayed, predetermined items are input in this screen, and either "execute" or "cancel" are selected. In the event that "cancel" is selected, dial-up settings are performed again. In the event that "execute" is selected, close-distance wireless connection is performed in step S1200. Here, the terminal capable of close-distance wireless communication is searched for, and a connection is established. Once a connection is established with information terminal 1, in step S1300 two child processes are generated for the dial-up process in step S1400 and a button input process in step S1600, and these are executed in parallel. Depending on the operating system, threads may be used instead of processes, and it should be noted that in the following embodiment, replacing the processes with threads does not change the processing flow in any way whatsoever, and exactly the same advantages can be obtained.

Figure 10:
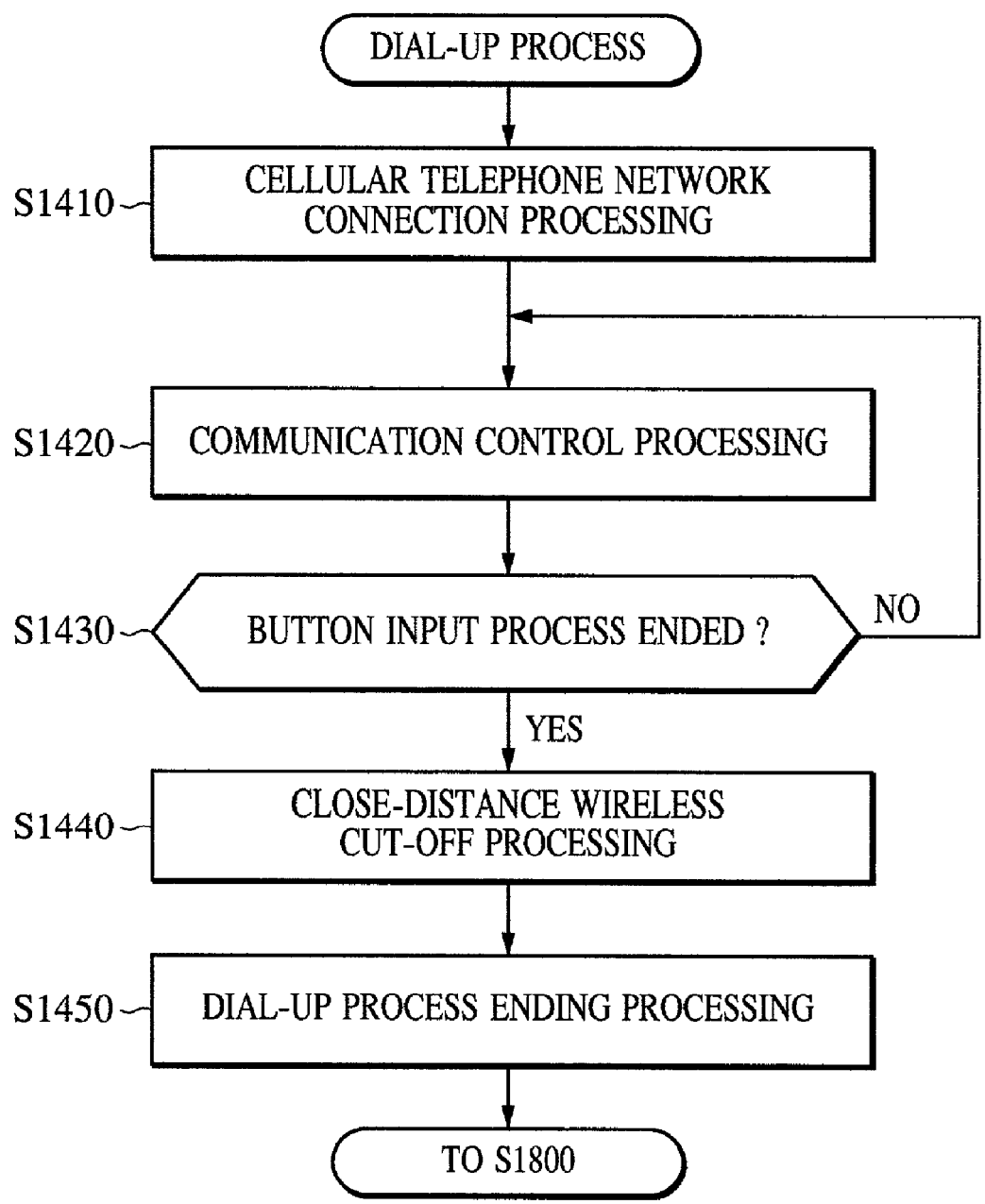
FIG. 10 is a flowchart illustrating the detailed procedures of the dial-up process (step S1400) shown in FIG. 9.

In the dial-up process in step S1400, as shown in FIG. 10, first, in step S1410, cellular telephone network connection processing is performed. With this cellular telephone network connection processing, connection is made to an ISP Gateway server 320 via a cellular telephone network, based on the data input in the above step S1100. Now, in the event that authentication is established, a connection with the ISP Gateway server 320 is set. At the same time, a connection is also set with the information terminal 1 connected by close-distance wireless communication, for data transfer with ISP Gateway server 320.

Next, in step S1420, communication control processing, i.e., control of data transfer using the connections set in the above step S1410, is performed. As shown in FIG. 13, data based on the HTTP protocol is exchanged between the information terminal 1 and the ISP Gateway server 320. Communication is carried out by converting this data into packets/frames following communication protocols of a lower order, i.e., of the close-distance wireless communication network and cellular telephone network. For example, the ISP Gateway server 320 transmits data with PPP frames according to the PPP protocol, so in the case of using Bluetooth technology, the PPP frame data is reconfigured into packet data such as L2CAP or the like, and sent to the information terminal 1. Data from the information terminal 1 is subjected to reverse conversion, and transmitted to the ISP Gateway server 320. Also, in the event that a wireless LAN such as IEEE 802.11 is used instead of Bluetooth, the PPP frame data is converted into MAC frame data and transmitted to the information terminal 1, and data from the information terminal 1 is subjected to reverse conversion, and transmitted to the ISP Gateway server 320.

Next, in step S1430, the flow waits for an end notification from the button input process (step S1600), and repeats the above processing until receiving the button input process end notification. Upon receiving the button input process ends notification, the flow proceeds to step S1440. In step S1440, the cellular telephone network cut off processing is performed, and in the subsequent step S1450, the dial-up process end notification is made to the parent process, thereby ending the process. Then, the flow proceeds to step S1800.

In step S1800, all connections between the information terminal 1 and cellular telephone 2 set with the close-distance wireless communication are ended, and cut-off of the close-distance wireless communication is performed. Then, the flow returns to step S1000.

In the button input process (step S1600) executed in parallel with the above dial-up process, as shown in FIG. 11, first, in step S1610, a connection for transmitting button input data with the information terminal 1 is set, and a communication port is determined. Then, in step S1620, the flow waits for input from the input button group 220, and upon input from the input button group 220, the flow proceeds to step S1630. In step S1630, the code of the pressed button is written to a button input communication port and transmitted to the information terminal 1, and in the following step S1640, judgement is made regarding whether or not the pressed button is the menu button "M". Here, in the event that the pressed button is not the menu button "M", the flow returns to the above step S1620. In the event that the pressed button is the menu button "M", the flow proceeds to step S1650.

In step S1650, the connection with the information terminal 1 for button input communication is ended, and the ending of the process is notified to the dial-up process, thereby ending the button input process.

Next, the processing of the information terminal 1 will be described with reference to FIG. 12.

Upon the electric power being turned on to the information terminal 1, first, initialization is performed in step S2000, as shown in FIG. 12. Here, programs stored in the ROM 15 are read out, the back-light 112 is lit, and the WWW browser screen shown in FIG. 8 is displayed on the LCD 113. Then, in step S2100, connection preparations for close-distance wireless communication is performed, and the flow waits for connection request from the cellular telephone 2. Now, in the event that there is a connection request from the cellular telephone 2 in step S2200, a close-distance wireless communication path is set following the connection request from the cellular telephone 2, and a button input connection for accepting button input data, and a dial-up connection for exchanging data with servers on the Internet, are set.

Next, in step S2300, the flow waits for arrival of the data to the button input connection set in the above step S2200, and upon the data arriving, this data is accepted as an event, and the flow proceeds to step S2400. In step S2400, the event received in the above step S2300 is interpreted, and appropriated to the various processes. Now, in the event that the above event is the menu button "M" event, the flow proceeds to step S2500, in the event that this is URL processing request, to step S2600, and in the event of the other processing, to step S2700.

In step S2500, menu button event processing is started, and in the subsequent step S2510, all close-distance wireless connections with the cellular telephone 2 are ended. Then, in step S2520, data which needs to be saved is written from the RAM 14 to the ROM 15, and electric power is turned off and quit.

In step S2600, a URL data request is started. Here, examples of typical URL processing request events are:

(1) A case wherein the user makes a list display of URLs which the user has saved beforehand, from the "favorites" menu in the display area 410 shown in FIG. 8, and uses a selection button (with the present embodiment, in the event that the push button 260 has been pushed).

(2) A case wherein, in a state where the cursor exists over an anchor tag indicating the link destination in the contents display area 430, the selection button is pressed.

(3) A case wherein the selection button is pressed immediately following the user directly inputting the URL in the address display area 420.

In these cases, the URL data processing from step S2600 on is performed. In step S2610, judgment is made regarding whether or not the specified URL is a URL corresponding to data existing within this information terminal, based on the analysis results of the specified URL information. In the event that the specified URL is a URL corresponding to data which exists within this information terminal, in step S2640 the HTML file within the terminal corresponding to the specified URL is read out from the cache area of the RAM 14 and stored in the HTTP data area of the RAM 14, and in the subsequent step S2660, the HTTP data stored in the RAM 14 is analyzed and converted into screen display data. Then, in step S2800, the processed data is transferred to VRAM 114, displayed on the display means 11, and the flow returns to step S2300.

In the event that judgement is made that the URL specified in the above step S2610 is not a URL corresponding to data existing within this information terminal, in step S2620, the URL information is transmitted as an HTTP protocol such as shown in FIG. 13, via a dial-up connection for performing exchange of HTTP data, and connection is made with the WWW server 330 via the ISP Gateway server 320. Then, in step S2630, the file specified by the URL is obtained and stored in the RAM 14. Next, in step S2660, the HTTP data stored in the RAM 14 is analyzed, and converted into screen display data. Then, in step S2800, the processed data is transferred to the VRAM 114 and displayed with the display means 11, and the flow returns to step S2300.

In step S2700, other processing is started. Examples of other processing include, for example, moving of the cursor by the 4-directional arrow buttons of the cursor moving/selecting button 260, screen scrolling by pushing of the cursor moving/selecting button to 60 within a scroll bar area of the screen, text input by numeral/character buttons in the input button group 220, and so forth. Next, in step S2710, processing corresponding to each of the events, such as moving the cursor, text input, etc., is performed, and in the subsequent step S2800, the processed data is transferred to the VRAM 114 and displayed on the display means 11, and then the flow returns to step S2300.

Thus, according to the present embodiment, a large screen can be used to view information on the network, without compromising portability or operability.

With the present embodiment, close-distance wireless communication is used for communication between the information terminal 1 and cellular telephone 2, but infrared communication methods such as IrDA or the like, for example, may be used instead.

Second Embodiment

Figure 14:
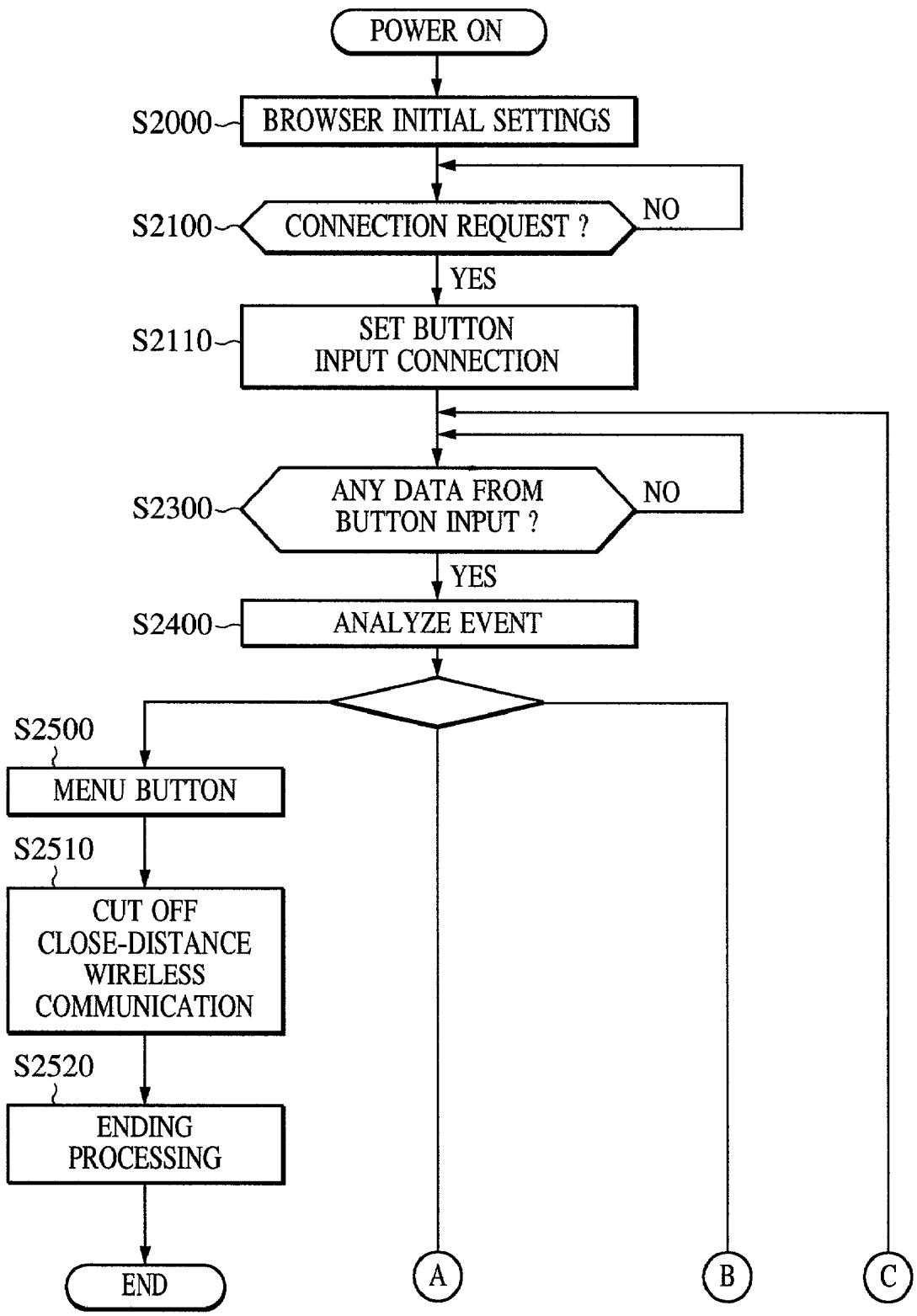
FIG. 14 is a flowchart illustrating the processing procedures with the portable information terminal according to a second embodiment of the present invention.
Figure 15:
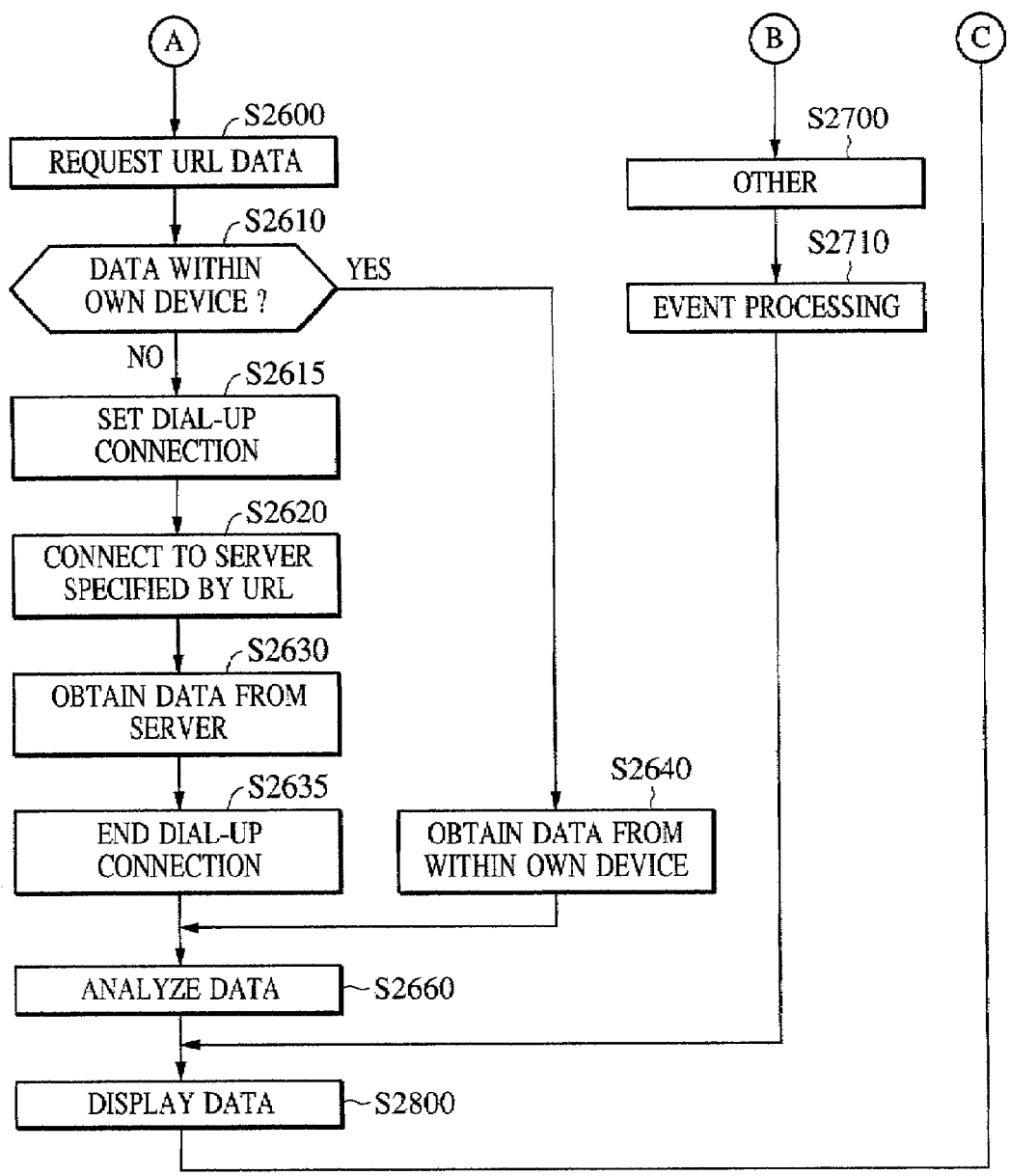
FIG. 15 is another flowchart illustrating the processing procedures with the portable information terminal according to the second embodiment of the present invention.
Figure 16:
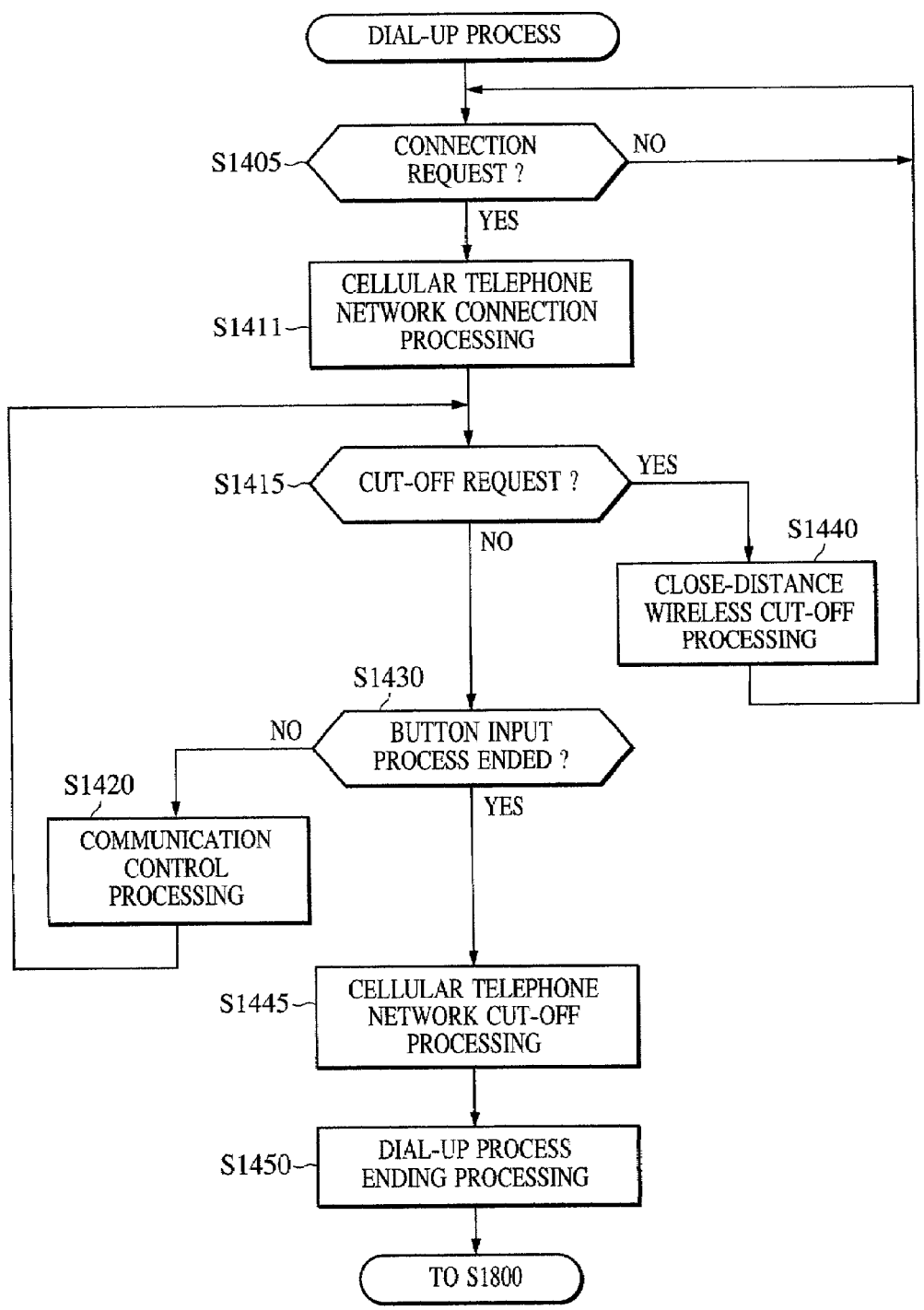
FIG. 16 is a flowchart illustrating the processing procedures with a cellular telephone connected to the portable information terminal according to the second embodiment of the present invention.

Next, a second embodiment of the present invention will be described with reference to FIGS. 14 to 16. FIGS. 14 and 15 are flowcharts illustrating the processing procedures with the portable information terminal according to the second embodiment of the present invention, and FIG. 16 is a flowchart illustrating the processing procedures with a cellular telephone connected to the portable information terminal according to the second embodiment of the present invention. With the present embodiment, the configuration of the first embodiment will be primarily used, and only the differing components will be described.

With the first embodiment, upon the user instructing connection with the information terminal 1 from cellular telephone 2, the close-distance wireless communication between the cellular telephone 2 and information terminal 1, and the cellular telephone network between the cellular telephone 2 and ISP Gateway server 320, are connected, and these connections are maintained until there are ending instructions for the entire operations (i.e., until the menu button "M" is pressed). Conversely, with the present embodiment, the cellular telephone network is connected only in the event that the information terminal 1 instructs access to the Internet, in order to reduce connection costs with the cellular telephone network. In this case, work such as creating documents or tabulating can be performed at the information terminal 1 by button input from the cellular telephone 2, in a state of being offline from the Internet, while accessing the Internet as necessary to obtain data. This allows for a wider range of applications.

These operations will be described. First, the processing at the information terminal 1 will be described with reference to FIGS. 14 and 15. FIGS. 14 and 15 differ from FIG. 12 (the first embodiment) with regard to steps S2110, S2615, and S2635. As shown in FIG. 14, in step S2110, the close-distance wireless communication path is set following a connection request from the cellular telephone 2, and a connection is set for accepting button input data. Then the flow proceeds to step S2300.

Also, the present embodiment differs in the point that, as shown in FIG. 15, in the event that judgment is made that the data for which a URL data request has been made is not in this device, the flow proceeds to step S2615. In this step S2615, a request is made to the cellular telephone 2 for setting a connection, by which to exchange data with a WWW server 330 on the Internet, as to the close-distance wireless communication path already set between the information terminal 1 and the cellular telephone 2, thereby establishing a dial-up connection. This time, a menu such as shown in FIG. 7B is displayed on the information terminal 1, so as to allow input regarding the dial-up information from the information terminal 1, thereby ensuring handiness for the user. Next, in step S2620, in the same manner as with a first embodiment, connection is made with the WWW server 340 specified by the URL, and in the subsequent step S2630, data is obtained from the WWW server 340. Then, in step S2635, a dial-up connection end request set in step S2615 is sent to the cellular telephone 2, thereby ending the connection, and the flow proceeds to step S2660.

Next, the processing of the cellular telephone 2 will be described with reference to FIG. 16. In the processing of the cellular telephone 2 according to the present embodiment, the dial-up process differs from the dial-up process in FIG. 9 (step S1400) of the first embodiment. Specifically, with the dial-up process according to the present embodiment, as shown in FIG. 16, first, in step S1405, the flow waits for a dial-up connection request from the information terminal 1, and upon a connection request occurring, the flow proceeds to step S1411. In step S1411, dial-up information is received from the information terminal 1, connection is made with the cellular telephone network, and in the subsequent step S1415, judgement is made regarding whether or not there is a cut-off request from the information terminal 1. Here, in the event that there is no cut-off request from the information terminal 1, in step S1430, the flow waits for an end notification from the button input process (step S1600), and in the event that no end notification of the button input process is received, in step S1420, communication control processing the same as with a first embodiment is performed, and the flow returns to step S1415. In the state wherein there is no cut-off request from the information terminal 1, the above communication control processing up to receiving the end notification from the button input process (step S1600) is repeatedly performed.

Upon the cut-off request coming from the information terminal 1 in the above step S1415, the cut-off process for the cellular telephone network is performed in step S1440, and the flow returns to step S1405.

Upon receiving the button input process end notification in step S1430, the cellular telephone network cut-off processing is performed in step S1445, and in the subsequent step S1450, the dial-up process end notification is made to the parent process, thereby ending this process. Then, the flow proceeds to step S1800.

Third Embodiment

Next, a third embodiment of the present invention will be described.

With the present embodiment, a data protocol for mobile communication networks, such as that used with cellular telephones or PHS (Personal Handyphone System), is built into the information terminal 1, so that direct connection can be made from the information terminal 1 to the mobile communication network. Also, the information terminal 1 and the cellular telephone 2 are connected by close-distance wireless communication, in the same manner as with the first embodiment.

Now, a pre-installed WWW browser can be used by pressing the menu button "M" on the cellular telephone 2, displaying the processing menu screen shown in FIG. 7A on the LCD 252, and selecting "Web" from this screen. At the same time as viewing the information of the desired URL with a browser on the cellular telephone 2, the URL currently being viewed is constantly transmitted to the information terminal 1. At this time, the information terminal 1 itself connects to the Internet, accesses the URL received from cellular telephone 2, obtains this information, and displays it on the WWW browser screen. That is, the cellular telephone 2 and the information terminal 1 can constantly display the contents of the same URL, and the information terminal 1 can use a high-resolution display screen to display a great number of contents at once. This is particularly effective in the case of displaying images, maps, and so forth. Particularly, in the case of viewing pages created to be viewed with the personal-computer, using the cellular telephone 2, the cellular telephone 2 is not capable of displaying the page in the way that the creator there of intended it to be viewed, but as described with the present embodiment, the contents of the same URL can be viewed at both the cellular telephone 2 and information terminal 1 at the same time, so both the contents created for personal computers and the contents created for the cellular telephone 2 can be suitably viewed.

At this time, a connection should be set for URL data communication in the close-distance wireless communication. Also, with the present embodiment, the information terminal 1 has built-in communication means enabling direct connection with a mobile communication network, the configuration also may be made such as wherein the information terminal 1 has a wireless LAN interface built in, so as to make a direct IP connection to access the Internet.

Fourth Embodiment

Figure 17:
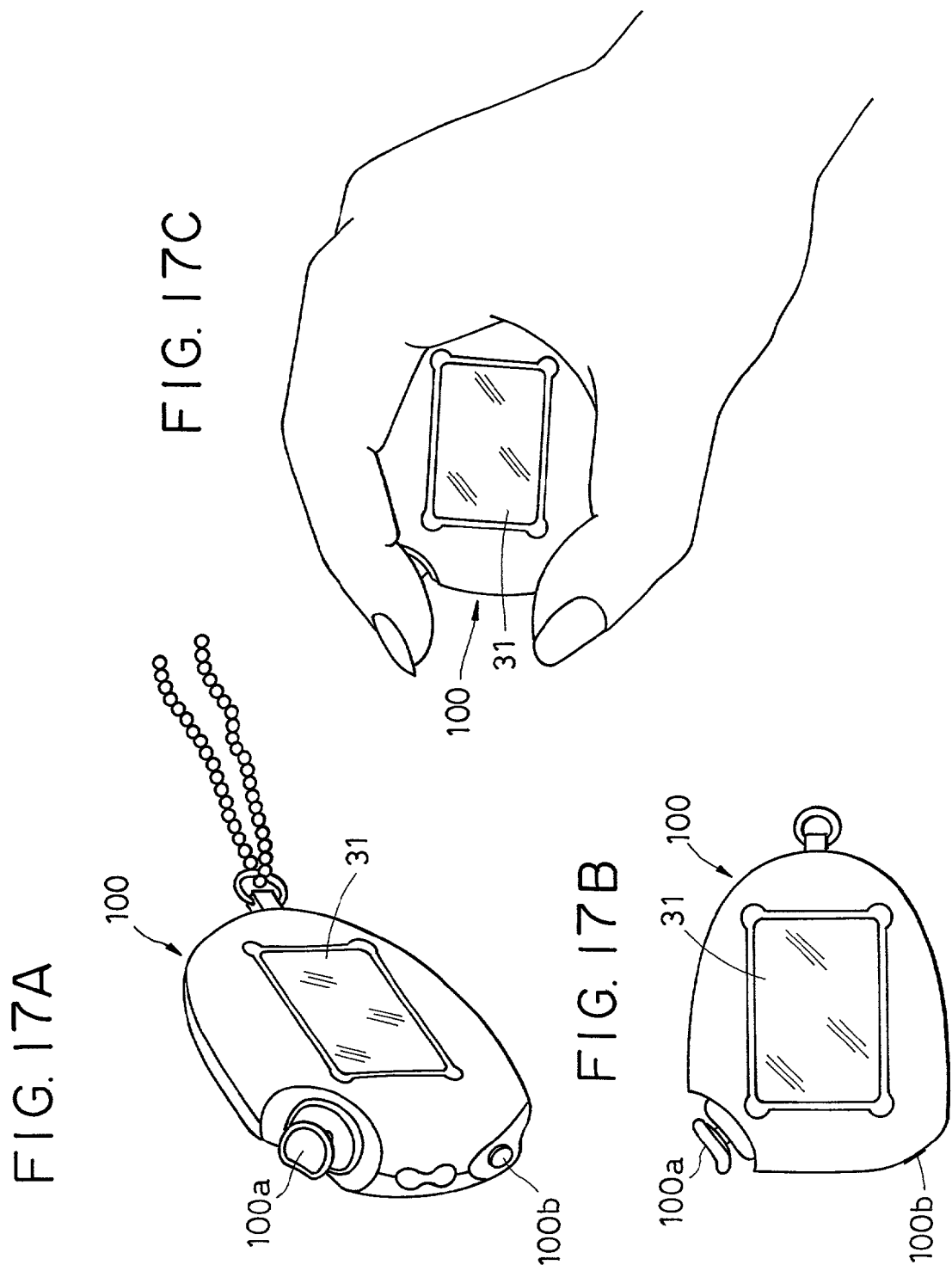
FIG. 17A is a perspective view showing the outside of the portable information terminal according to a fourth embodiment of the present invention.
FIG. 17B is a frontal view of the portable information terminal shown in FIG. 17A.
FIG. 17C is a diagram illustrating a state wherein the portable information terminal shown in FIG. 17A is held in the hand of a user.
Figure 18:
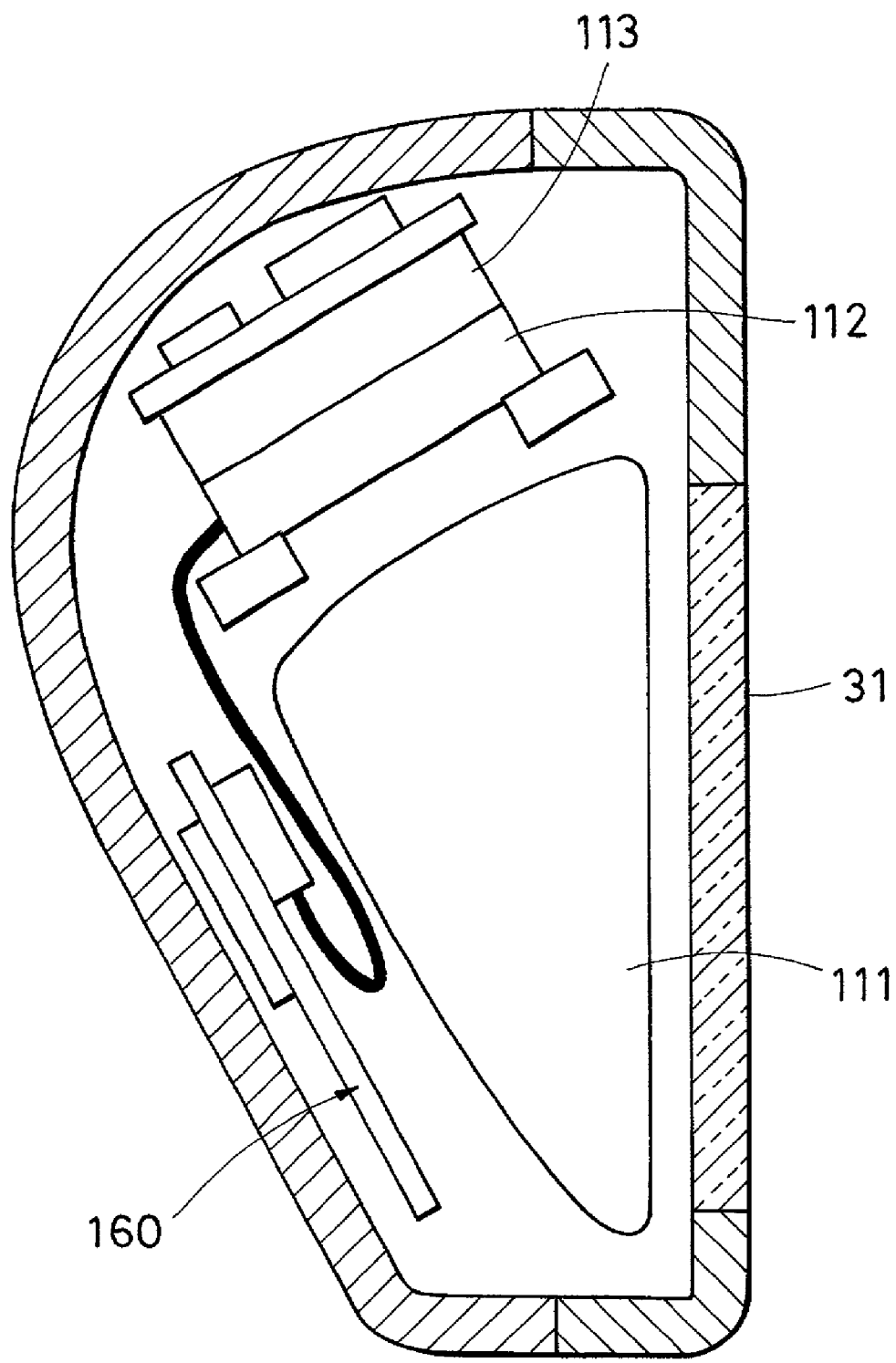
FIG. 18 is a cross-sectional diagram illustrating the configuration of the optical system of the portable information terminal shown in FIG. 17.

Next, a fourth embodiment of the present invention will be described with reference to FIGS. 17A through 18. FIG. 17A is a perspective view showing the outside of the portable information terminal according to a fourth embodiment of the present invention, FIG. 17B is a frontal view, FIG. 17C is a diagram illustrating a state wherein the portable information terminal shown in FIG. 17A is held in the hand of a user, and FIG. 18 is a cross-sectional diagram illustrating the configuration of the optical system of the portable information terminal shown in FIG. 17.

As shown in FIG. 17A, the information terminal 100 according to the present embodiment has functions for viewing contents on a network with a display means (shown in FIG. 18) by cooperating with the cellular telephone (not shown), and uses batteries (not shown) as an electric power source. With this information terminal 100, an operating switch 100a is provided at the upper part of the left side of the main unit, and an electric power switch 100b at the lower part thereof, as shown in FIGS. 17A and 17B. Also, the information terminal 100 has an external size which allows the user to hold it with the right hand, as shown in FIG. 17C, and as shown in this figure, the operating switch 100a is disposed at the position where it can be operated by the index finger of the right hand holding the information terminal 100. The operating switch 100a is a switch for performing moving up of the cursor 440 on the WWW browser screen (shown in FIG. 8) displayed on the LCDs 113, selecting items, etc., and operating the operating switch 100a generates an input event. That is to say, the present embodiment is configured such that the various operations can be performed using the input button group on the cellular telephone or the operating switch 100a. Further, the user can see the information displayed on the display means through the window 31 by bringing one eye close to the window 31 and looking in while holding the information terminal 100 with the right hand, for example.

Here, the display means in the present embodiment is for performing large-screen display via an ocular-type enlarging optical system. As shown in FIG. 18, the display means is configured from a back-light 113, an LCD 112, and a sculptured surface prism 111. Here, in the present embodiment, the sculptured surface prism 111 is formed of a wedge-shaped prism, and is configured so as to introduce light from the LCD 112 to the eye of the user looking in from the window 31. That is, unlike the first embodiment, the present embodiment omits the prism 111b, and uses a sculptured surface prism 111 allowing only the display screen of the LCD 112 to be viewed. Also, behind the sculpted surface prism 111 is disposed an electric circuit board 160 (a board equivalent to the main board 151, display control board 152, etc., in the first embodiment).

In this way, according to the present embodiment, the information terminal 100 is used by the user holding the information terminal 100 in the right hand while bringing one eye close to the window 31 and looking in, and confirming the button operations of the cellular telephone with the eye which is not looking at the screen.

Also, the optical systems shown in FIG. 18 may be configured as an HMD which can be worn on only one eye (not shown). In this case as well, the essence of the present invention is not compromised.

Also, the present invention can be achieved by supplying a recording medium storing software program code for realizing the functions of the above-described embodiments, to a system or device, and reading out the program code stored in the recording medium by the system or device computer (CPU or MPU). In this case, the program code itself read out of the recording medium realizes the functions of the above-described embodiments, and the recording medium storing the program code constitutes the present invention. Examples of recording media for supplying the program code include, for example, floppy (registered trademark) disks, hard disks, optical disks, magneto-optical disks, CD-ROMS, CD-Rs, DVD-ROMS, magnetic tape, non-volatile memory cards, ROM, etc.

As described above, according to the present invention, information on a network is obtained cooperatively with a cellular telephone connected by connecting means, and a screen for viewing the obtained information is displayed on display means for performing large-screen display, via an ocular-type enlarged optical system, and operations of operating buttons on the cellular telephone connected by the connecting means is taken as operations relating to viewing of information, so information on the network can be viewed using a large screen without compromising portability or operability.

Also, according to the present invention, information on a network is obtained cooperatively with a cellular telephone connected by connecting means, and a screen for viewing the obtained information is displayed on display means for performing large-screen display, and operations of operating buttons on the cellular telephone connected by the connecting means is taken as operations relating to viewing of information, so information on the network can be viewed using a large screen without compromising portability or operability.

Further, according to the present invention, a screen for viewing information is displayed on display means via an enlarging optical system, and operations of operating buttons on the cellular telephone connected by the connecting means is taken as operations relating to the image displayed on the display means, so information on the network can be viewed using a large screen without compromising portability or operability.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:
1. A portable information terminal, comprising:
   display means for performing large-screen display via an enlarging optical system;

connecting means for communicably connecting with a cellular telephone which has a browser for viewing information on a network, and operating buttons;

information viewing means for obtaining information on the network cooperatively with the cellular telephone connected via said connecting means, and generating a screen for displaying the information obtained from the network on said display means;

receiving means for receiving information from an operated button of the operating buttons provided on the cellular telephone;

an event analyze means for specifying an event corresponding to the button information received by said receiving means; and operation means for operating the event specified by said event analyze means as operations relating to the displaying of information by said information viewing means.

2. A portable information terminal according to claim 1, wherein said enlarging optical system is an ocular-type enlarging optical system.

3. A portable information terminal according to claim 1, wherein said enlarging optical system of said display means is formed of a semi-transmitting optical system, and wherein said semi-transmitting optical system superimposes screens displayed by said information viewing means and external light rays so as to image at an observation position.

4. A portable information terminal according to claim 1, wherein said display means, said information viewing means, said connecting means, and said operation input means are integrated, so as to be capable of mounting on the head of a user.

5. A portable information terminal according to claim 1, wherein the cellular telephone has a plurality of buttons as said operating buttons, and wherein data input such as input of characters, numerals, symbols, and the like, cursor moving commands, specification of position, selection commands, and other such plurality of operations made on the screen of said display means, are each appropriated to said plurality of buttons.

6. A portable information terminal according to claim 1, further comprising network connection control means for controlling the network connection of the cellular telephone to connect to the network when network information is necessary and to disconnect from the network when network information is no longer necessary.

7. A portable information terminal according to claim 1, wherein the screen generated by said information viewing means contains an area for displaying contents from the network, such as contents described in html, and one or more areas for displaying objects for controlling the display, such as a menu area, a button array area, an area for displaying/inputting IJRLs, and a cursor.

8. A portable information terminal according to claim 1, wherein said connecting means generates two processes or threads that are executed in parallel, one process or thread for obtaining information on the network and the other process or thread for inputting operations.

9. A portable information terminal according to claim 1, further comprising:
a memory for storing information,
wherein said information viewing means determines if the requested information is found in the memory before obtaining the information from the network.

10. A portable information terminal according to claim 1, wherein said event scrolls the screen generated by said information viewing means.

11. A portable information terminal according to claim 1, wherein said event inputs characters on the screen generated by said information viewing means.

12. A portable information terminal according to claim 1, wherein said event moves cursors displayed on the screen generated by said information viewing means.

13. A portable information terminal comprising:
display means for performing large-screen display via an enlarging optical system;
first connecting means for communicably connecting with a network via a cellular telephone;
second connecting means other than said first connecting means for communicably connecting with the network;
browser means for obtaining information on the network via said second communication means, and displaying the obtained information on the screen of said display means for viewing; and
communication destination information setting means for taking in, from the cellular telephone connected via said first connecting means, communication destination information currently being viewed with the browser of the cellular telephone, and setting the communication destination information that has been taken in, in said browser means to obtain information from the network based on the communication destination information.

14. A portable information terminal according to claim 1, wherein the cellular telephone has close-distance wireless communication means, and wherein said connecting means includes means capable of wireless communication with said close-distance wireless communication means.

15. A portable information terminal according to claim 14, wherein said close-distance wireless communication means and said connecting means are made up of wireless communication means using spectrum communication.

16. A portable information terminal according to claim 14, wherein said close-distance wireless means and said connecting means are made up of wireless communication means using infrared rays as a medium.

17. An information viewing method, wherein a cellular telephone which has a browser for viewing information on a network and operating buttons, and a portable information terminal comprising connecting means for communicably connecting with the cellular telephone and display means for performing large-screen display via an enlarging optical system cooperate so as to view information on the network with the display means of the portable information terminal, said method comprising the steps of:
connecting the portable information terminal with the cellular telephone via the connecting means;
cooperating the portable information terminal with the cellular telephone with which connection is made via the connecting step, to obtain information on the network;
generating a screen by the portable information terminal for displaying the information obtained in the cooperating step on the display means;
receiving information from an operated button of the operating buttons provided on the cellular telephone;
specifying an event corresponding to the button information received in the receiving step; and
providing for the portable information terminal to operate the event specified as operations relating to the displaying of the information.

18. A program for viewing information on a network with display means, executed on a portable information terminal comprising connecting means for communicably connecting with a cellular telephone which has a browser for viewing information on the network and operating buttons, and the display means for performing large-screen display using an enlarging optical system, said program comprising:

an information viewing module for obtaining information on the network cooperatively with the cellular telephone connected via the connecting means, and generating a screen for displaying the information obtained from the network on the display means in a viewable manner;

a receiving module for receiving information from an operated button of the operating buttons provided on the cellular telephone;

an event analyze module for specifying an event corresponding to the button information received via the receiving module; and an operation module for operating the event specified by the event analyze module as operations relating to viewing of information by the information viewing module.

* * * * *

UNITED STATES PATENT AND TRADEMARK OFFICE
CERTIFICATE OF CORRECTION

| | | |
|---|---|---|
| PATENT NO. | : 7,061,449 B2 | Page 1 of 1 |
| APPLICATION NO. | : 10/153605 | |
| DATED | : June 13, 2006 | |
| INVENTOR(S) | : Takashi Oya et al. | |

It is certified that error appears in the above-identified patent and that said Letters Patent is hereby corrected as shown below:

COLUMN 6:

Line 27, "at" should be deleted.

COLUMN 8:

Line 13, "In" should read --in--.

Signed and Sealed this

Thirteenth Day of November, 2007

JON W. DUDAS
*Director of the United States Patent and Trademark Office*